(12) United States Patent
Xiong

(10) Patent No.: US 12,329,081 B2
(45) Date of Patent: Jun. 17, 2025

(54) MODULAR GARDENING SYSTEMS

(71) Applicant: VEGO INNOVATIONS, INC., Tomball, TX (US)

(72) Inventor: Guangyuan Xiong, Houston, TX (US)

(73) Assignee: VEGO INNOVATIONS, INC., Tomball, TX (US)

( * ) Notice: Subject to any disclaimer, the term of this patent is extended or adjusted under 35 U.S.C. 154(b) by 113 days.

(21) Appl. No.: 17/961,170

(22) Filed: Oct. 6, 2022

(65) Prior Publication Data

US 2023/0111009 A1 Apr. 13, 2023

Related U.S. Application Data

(60) Provisional application No. 63/253,188, filed on Oct. 7, 2021.

(51) Int. Cl.
| | | |
|---|---|---|
| *A01G 9/24* | (2006.01) | |
| *A01C 23/00* | (2006.01) | |
| *A01C 23/04* | (2006.01) | |
| *A01G 9/02* | (2018.01) | |
| *A01G 9/12* | (2006.01) | |
| *A01G 9/28* | (2018.01) | |
| *A01G 13/21* | (2025.01) | |
| *A01G 27/00* | (2006.01) | |

(Continued)

(52) U.S. Cl.
CPC ............ *A01G 9/247* (2013.01); *A01C 23/007* (2013.01); *A01C 23/042* (2013.01); *A01G 9/02* (2013.01); *A01G 9/12* (2013.01); *A01G 9/249* (2019.05); *A01G 9/28* (2018.02); *A01G 13/21* (2025.01); *A01G 27/003* (2013.01); *A01G 27/04* (2013.01); *B25H 3/02* (2013.01)

(58) Field of Classification Search
CPC .. A01G 9/1407; A01G 9/1423; A01G 9/1438; A01G 2009/1446; A01G 2009/1453; A01G 2009/1461; A01G 9/22; A01G 9/20; A01G 9/24; A01G 9/242; A01G 9/243; A01G 9/247; A01G 9/26; A01G 9/249; A01G 9/28; A01G 9/12; A01G 9/122; A01G 9/124; A01G 9/128; A01G 9/143; A01G 27/04; A01G 27/06; A47G 7/041; A47G 7/04; F16B 2/06; F16B 2/065

See application file for complete search history.

(56) References Cited

U.S. PATENT DOCUMENTS 4,316,347 A * 2/1982 Smith ...................... A01G 9/16 D25/16
5,675,932 A * 10/1997 Mauney ................. A01G 31/02 47/17

(Continued)

FOREIGN PATENT DOCUMENTS

CN 105830813 A * 8/2016
WO WO-2020025842 A1 * 2/2020 ............. A01G 27/06

*Primary Examiner* — Trinh T Nguyen
(74) *Attorney, Agent, or Firm* — Troutman Pepper Locke; Tim Tingkang Xia, Esq.

(57) ABSTRACT

A modular gardening system (MGS) for plant growing, the system comprising a garden bed for containing soil that is configured to grow at least one plant therein; an elevated rolling stand module supporting the garden bed; a bed cover system module disposed on top of the garden bed; and a mister irrigation module providing irrigation to the plant.

29 Claims, 21 Drawing Sheets

(51) Int. Cl.
*A01G 27/04* (2006.01)
*B25H 3/02* (2006.01)

(56) References Cited

U.S. PATENT DOCUMENTS

| | | | | |
|---|---|---|---|---|
| 6,622,425 | B2* | 9/2003 | Shepherd | A01G 9/16 47/17 |
| 7,159,358 | B2* | 1/2007 | Yawney | A01G 9/1423 47/65.5 |
| 8,839,552 | B1* | 9/2014 | Hudson | A01G 9/28 47/33 |
| 2008/0313960 | A1* | 12/2008 | Norvitch | A01G 9/02 47/79 |
| 2014/0083005 | A1* | 3/2014 | Collins | F16M 11/42 280/35 |
| 2014/0190077 | A1* | 7/2014 | Burmann | B65D 19/42 220/4.01 |
| 2016/0286733 | A1* | 10/2016 | Fair | A01G 7/045 |
| 2018/0242531 | A1* | 8/2018 | Berry, III | A01G 27/02 |
| 2021/0302973 | A1* | 9/2021 | King | A01G 9/26 |
| 2023/0189722 | A1* | 6/2023 | Xiong | A01G 22/05 47/33 |

* cited by examiner 101   103

FIG. 9 Wall Trellis for garden bed

MODULAR GARDENING SYSTEMS

CROSS-REFERENCE TO RELATED PATENT APPLICATIONS

This application claims priority to and the benefit of U.S. Provisional Patent Application Ser. No. 63/253,188, filed Oct. 7, 2021, which is incorporated herein in its entirety by reference.

FIELD OF THE INVENTION

The present disclosure relates generally to the garden bed assembly. In particular, the invention is directed to a variety of modular gardening systems used in association with the garden bed assembly.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Raised garden beds are a preferred way to grow the plants within an established area by many professional gardeners and amateur home owners. The use of raised garden beds is particularly widespread in areas in which the soil is poor and/or where good drainage is required.

Raised garden beds are provided in many forms. However, common drawbacks of the garden beds limit the functionality of the garden beds. The common drawbacks include lacking of mobility so that the garden beds cannot be moved once it is constructed on the ground; lacking of protection against critters and pests; lacking of a precisely controlled irrigation system in terms of temperature and humidity; lacking of a self-watering system to collect excess water; lacking of adjustable trellis connect to one or more garden beds for vines; lack of smart control including self-modulated pH control and minerals control of the soil, and etc.

Therefore, a need exists for modular gardening systems to accommodating these drawbacks discussed above and improve the function and operation of the garden beds.

SUMMARY OF THE INVENTION

In light of the foregoing, this invention discloses a modular gardening system (MGS) which is a revolutionary modularized gardening system used in association with garden beds. The MGS includes add-on modules provide easy and practical functions to the garden beds. The MGS includes raised garden beds module, elevated rolling stand module, bed cover systems module, mister irrigation module, wicking cell/self-watering module, arched trellis module, and wall trellis module.

In one aspect of the invention, a modular gardening system (MGS) for plant growing, the system comprising a garden bed for containing soil that is configured to grow at least one plant therein; an elevated rolling stand module supporting the garden bed; a bed cover system module disposed on top of the garden bed; and a mister irrigation module providing irrigation to the plant.

In one embodiment, the elevated rolling stand module comprises an elevated platform supporting the garden bed, and a plurality of supporting legs mechanically connected to the elevated platform on the upper end of each supporting leg and support the elevated platform.

In one embodiment, the length of each of the supporting legs is adjustable such that the height of the elevated platform is adjustable.

In one embodiment, the elevated rolling stand module further comprises at least one handle attached to the elevated platform; and each supporting leg is connected to a wheel on its lower end.

In one embodiment, the elevated rolling stand module further comprises a lower platform locates below the elevated platform.

In one embodiment, the bed cover system module comprises a cover frame supported by a plurality of frame legs, wherein the frame legs are mechanically connected to the garden bed.

In one embodiment, the length of each of the frame legs are adjustable such that the height of the cover frame is adjustable.

In one embodiment, bed cover system module further comprises a mesh, wherein the mesh is disposed over the cover frame and the frame legs.

In one embodiment, the mesh balances humidity of a space between the garden bed and the mesh.

In one embodiment, the mister irrigation module comprises at least one mister, at least one pipe in fluid communication with the at least one mister and a water source; wherein the at least one mister provides water irrigation to the plant in the garden bed.

In one embodiment, the mister irrigation module further comprises at least one sensor to monitor at least one growth condition.

In one embodiment, the at least one sensor comprises one or more of humidity sensor, temperature sensor, pH sensor, nitrogen sensor, phosphorus sensor, potassium sensor, minerals sensor; and the growth condition comprises humidity of the soil and space above the soil, temperature of the soil and the space above the soil, pH of the soil, nitrogen concentration of the soil, phosphorus concentration of the soil, potassium concentration of the soil, minerals concentrations of the soil.

In one embodiment, the humidity sensor monitors the humidity of the soil, the temperature sensor monitors the temperature of the soil, the pH sensor monitors the pH value of the soil, the nitrogen sensor monitors the nitrogen concentration of the soil, the phosphorus sensor monitors the phosphorus concentration of the soil, the potassium sensor monitors the potassium concentration of the soil, the minerals sensor monitors one or more minerals concentration of the soil.

In one embodiment, the mister irrigation module further comprises a control unit in communication with the at least one sensor, such that the control unit is configured to receive at least one growth condition.

In one embodiment, the mister irrigation module further comprises a nutrition container in communication with the control unit, wherein the nutrition container comprises at least one solution housing containing a nutrition solution comprising at least one of a pH buffer solution, a nitrogen solution, a phosphorus solution, a potassium solution, and a mineral solution.

In one embodiment, the nutrition container comprises a plurality of solution housings, wherein each solution housing separately contains one nutrition solution contains one or more of a pH buffer solution, a nitrogen solution, a phosphorus solution, a potassium solution, and a mineral solution.

In one embodiment, the control unit controls the nutrition container and the at least one misters to irrigate one or more nutrition solutions to the plant based on the growth condition monitored by the at least one sensors.

In one embodiment, the control unit is in wire or wireless communication with a terminal, wherein the terminal remotely controls the water irrigation and nutrition solution irrigation via the control unit.

In one embodiment, the terminal receives at least one preferred growth condition from a user, wherein the terminal compares the growth condition received from the control unit and the preferred growth condition from the user, and the terminal controls the water irrigation and nutrition solution irrigation via the control unit based on the comparison.

In one embodiment, the MGS further comprises a camera in wireless communication with a terminal, wherein the camera obtains picture information of the plant in the garden bed and transmits the picture information to the terminal.

In one embodiment, the MGS further comprises a wicking cell/self watering module, wherein the wicking cell/self watering module comprises a wicking tray having a water reservoir and at least one recessed cell in fluid communication with the water reservoir.

In one embodiment, the water reservoir collects the excess water from the soil via the recessed cell when the humidity of the soil is high.

In one embodiment, the wicking tray further comprises a vertical tube in fluid communication with the water reservoir.

In one embodiment, the wicking tray is disposed on the bottom of the garden bed.

In one aspect of the invention, a modular gardening system (MGS) for plant growing, the system comprising a garden bed having at least one wall panel for containing soil that is configured to grow at least one plant therein; and a trellis module connected to the garden bed, wherein the trellis module is connected to the garden bed via at least one trellis connector.

In one embodiment, the trellis module comprises at least two vertical pillars, and at least one horizontal frame.

In one embodiment, the vertical pillars are received by the trellis connectors which are mechanically connected to the wall panel of the garden bed.

In one embodiment, the distance between the two vertical pillars and the length of the at least one horizontal frame are configured to be customizable based on the dimension of the garden bed.

In one embodiment, the trellis connector comprises a side base and a pair of connector brackets integrated with the side base, wherein the side base is in seamless contact with the wall panel of the garden bed.

In one embodiment, each of the connector brackets contains a fastening hole configured to receive a fastener attaching the vertical pillar to the wall panel of the garden bed.

In one embodiment, the trellis module comprises at least one arched pillar, wherein each of the arched pillars comprises a pair of pillar legs supporting an arch.

In one embodiment, the trellis module comprises at least two arched pillars, and one or more horizontal frame connecting the two arched pillars.

In one embodiment, the distance between the two arched pillars and the length of the horizontal frame are customizable so as to accommodate the dimension of the garden bed.

In another aspect of the invention, a gardening solar light used in association with a garden bed for plant growing, the gardening solar light comprising a light frame; a solar panel attached to a top surface of the light frame; a light in electrical communication with the solar panel; and a light connector connecting the gardening solar light to a wall panel of the garden bed, wherein one surface of the light connector is in seamless contact with the wall panel.

In one embodiment, the surface of the light connector in seamless contact with the wall panel of the garden bed comprise a curved section.

In one embodiment, the light connector comprise a magnet such that the gardening solar light is connected to the wall panel via magnetic force.

In another aspect of the invention, a modular gardening system (MGS) with a tool box for plant growing, the system comprising a garden bed having at least one wall panel for containing soil that is configured to grow at least one plant therein; and a tool box configured to contain at least one gardening tool, wherein the tool box is removeably attached to the garden bed.

In another aspect of the invention, the tool box comprises at least one hook which is configured to receive a portion of a top edge of the wall panel of the garden bed.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
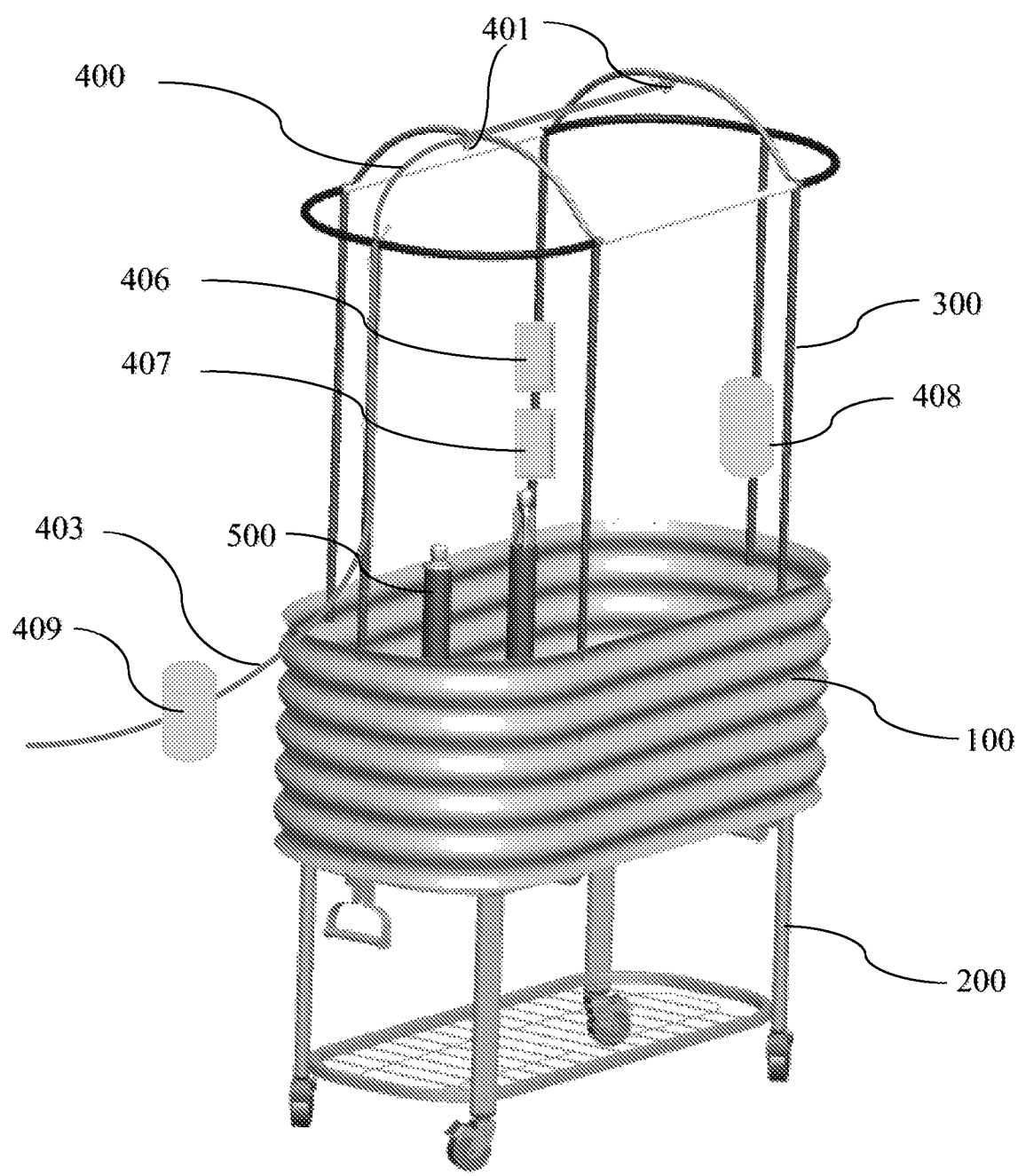
FIG. 1 depicts a perspective view of a modular gardening system (MGS) including raised garden bed module, elevated rolling stand module, bed cover systems module, mister irrigation module, wicking cell/self-watering module according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

Present system described herein features a modular gardening system (MGS) which is a revolutionary modularized gardening system used in association with garden beds. The MGS includes add-on modules provide easy, practical, and smart controlled functions to the garden beds. The MGS includes raised garden beds module, elevated rolling stand module, bed cover systems module, mister irrigation module, wicking cell/self-watering module, arched trellis module, and wall trellis module.

FIG. 1 shows a modular gardening system (MGS) including a raised garden bed 100 module, an elevated rolling stand module 200, a bed cover systems module 300, a mister irrigation module 400, and a wicking cell/self-watering module 500 according to embodiments of the invention.

It is readily appreciated that the raised garden bed 100 includes one or more wall panels forming a peripherally enclosed area for containing soils and plants grow therein. In one embodiment, the raised garden bed 100 also includes one or more angled joint panels having a predetermined or adjustable angle. The one or more angled joint panels are connected with the wall panels such that the raised garden bed may have a variety of shapes.

As shown in FIG. 1, the raised garden bed 100 is connected to and supported by the elevated rolling stand module 200, which provides extra height for bend-free gardening. That is, the position of the garden bed is elevated by the elevated rolling stand module 200 to a height which permits a user to perform the gardening works in the garden bed 100 without bending his or her body forward or lowering his or her upper body. In addition, the elevated rolling stand module 200 includes a plurality of wheels permitting to the garden bed to be rolled, facilitating the mobility of the garden bed.

As shown in FIG. 1, the bed cover system module 300 is disposed on top of and connected to the raised garden bed 100. The bed cover system module 300 prevents the critters and pests from accessing the raised garden bed 100. In addition, the bed cover system module 300 also balances humidity for the garden bed by maintaining the humidity inside the module. In one embodiment, the bed cover system includes a bed cover frame connect to the wall panel(s) of the raised garden bed 100, and a cover mesh attached to or disposed over the bed cover frame.

The mister irrigation module 400 performs smart automatic and/or manual irrigation function. The mister irrigation module includes one or more misters, at least one sensors, and a control unit module for easier irrigation management. In one embodiment, the mister irrigation system module 400 is mechanically associated with or connected to the bed cover system module 300. In one embodiment, the mister irrigation module 400 includes temperature sensors, humidity sensors, pH sensors, sensors for nitrogen, phosphorus, potassium, and minerals for the soils in the garden bed, which provide timely monitoring of the garden bed soil conditions including pH value, nitrogen content, phosphorus content, potassium content, minerals content, and etc.

As shown in FIG. 1, the wicking cell/self-watering module 500 is disposed at the bottom of the raised bed garden 100, to collect excess water when the soil moisture level is high, and to feed the dry soil through wicking when the soil moisture level is low. In one embodiment, the wicking cell/self-watering module 500 is enclosed inside the raised bed garden and is supported by the elevated rolling stand module 200. In another embodiment, the wicking cell/self-watering module 500 is disposed under the raised bed garden 100 and on top of the elevated rolling stand module 200.

Each of the aforementioned modules is disclosed in details below.

Figure 2:
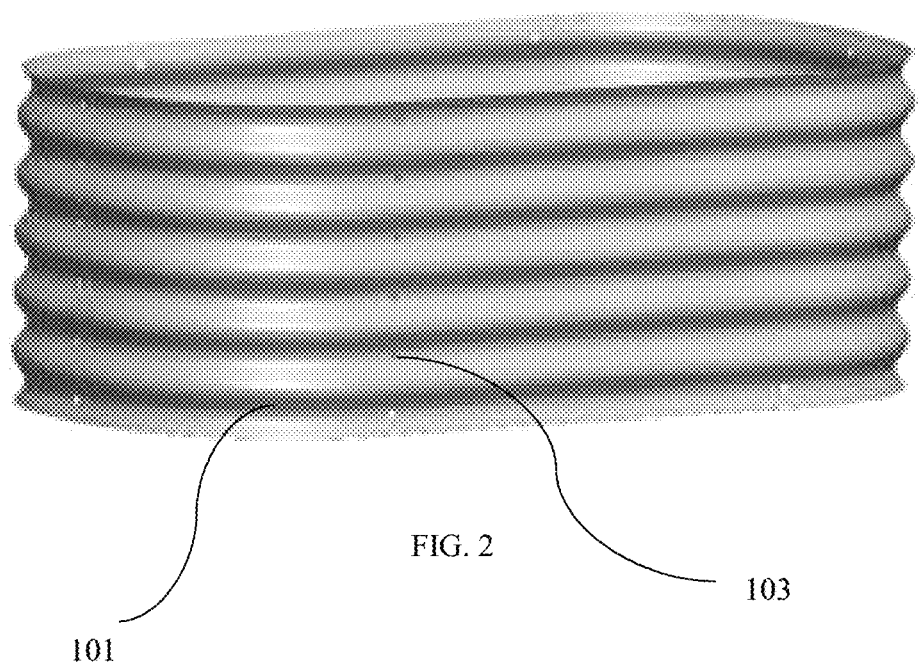
FIG. 2 depicts a perspective view of the raised garden bed module shown in FIG. 1.

The raised bed garden 100 is further illustrated in FIG. 2. The raised bed garden 100 includes one or more wall panels 101, which is made of metal, plastic, wood, or any other proper materials. In one embodiment, the raised bed garden 100 may further include one or more angled joint panels connected to the wall panels 101. The angled joint panels have a predetermined or adjustable angle. One or more angled joint panels are connected with the wall panels such that the raised garden bed may have a variety of shapes. The height of the wall panels ranges from 5 inches to 50 inches. In one embodiment, the wall panel may have a height of 5, 10, 15, 20, 25, 30, 35, 40, 45, or 50 inches.

In one embodiment, the raised garden bed 100 includes a plurality of fastening holes 103 in the wall panels 101 and/or angled joint panels. In one embodiment, the fastening holes connects the wall panels 101 to the angled joint panels, the elevated rolling stand module 200, the bed cover systems module 300, the mister irrigation module 400, or wicking cell/self-watering module 500. In one embodiment, the wall panels 101 is directly mechanically connected to the angled joint panels, the elevated rolling stand module 200, the bed cover systems module 300, the mister irrigation module 400, or the wicking cell/self-watering module 500 via one or more fasteners received through the fastening holes. In another embodiment, the wall panels 101 is indirectly mechanically connected to the angled joint panels, the elevated rolling stand module 200, the bed cover systems module 300, the mister irrigation module 400, or the wicking cell/self-watering module 500 via one or more connectors received by the fastening holes. In one embodiment, the fastening holes connects the wall panels 101 to the wall trellis module 600 to the arched trellis module 700, either directly, or indirectly via one or more trellis connectors.

In one embodiment, the wall panel 101 includes a plurality of curved sections such that the wall panel 101 has a sinusoidal profile, as shown in FIG. 2. In another embodiment, the wall panel includes a plurality of triangle or rectangular sections such that the wall panel has a triangle jagged or rectangular jagged profile, respectively.

Figure 3:
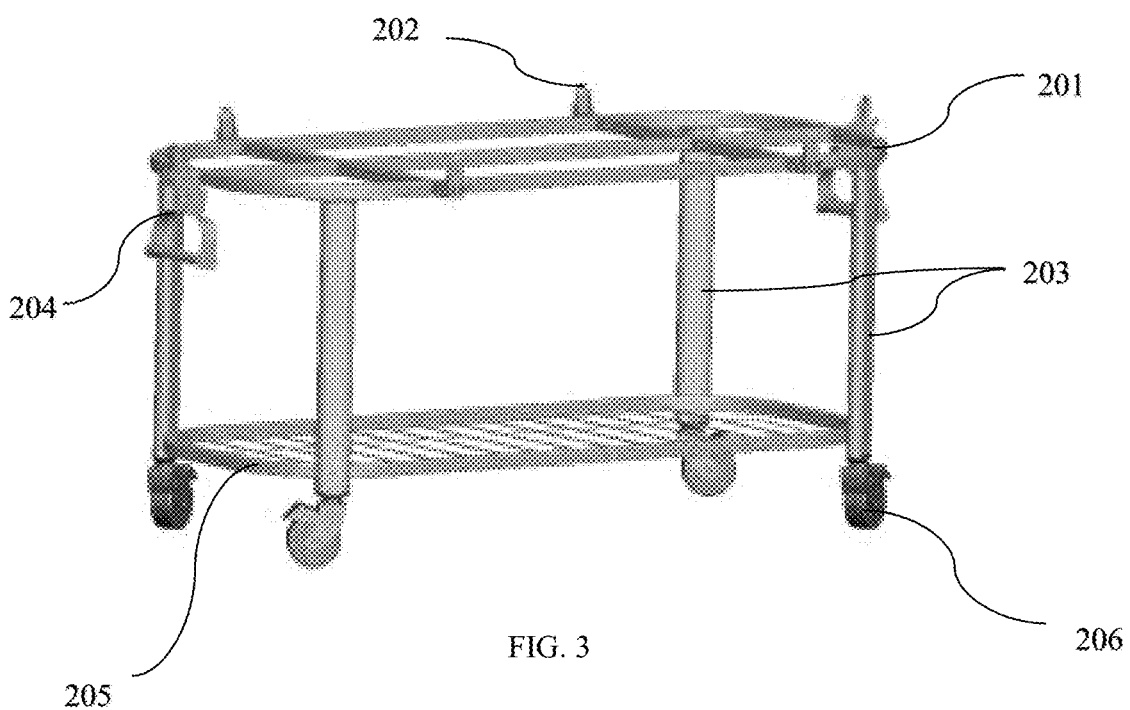
FIG. 3 depicts a perspective view of the elevated rolling stand module shown in FIG. 1.

FIG. 3 shows the elevated rolling stand module 200. The elevated rolling stand module 200 includes an elevated platform 201 on which the raised bed garden 100 is disposed. In one embodiment, the elevated platform 201 has an outer frame which has the same shape comparing to the raised garden bed 100. In one embodiment, the outer frame may have a shape different from the raised garden bed 100. In one embodiment, the elevated platform 201 includes a plurality of supporting beams connected to the outer frame so as to provide support to the raised garden bed 100. In one embodiment, the plurality of supporting beams may be parallel with each other. In another embodiment, the plurality of supporting beams may across and interconnected with each other.

Figure 6:
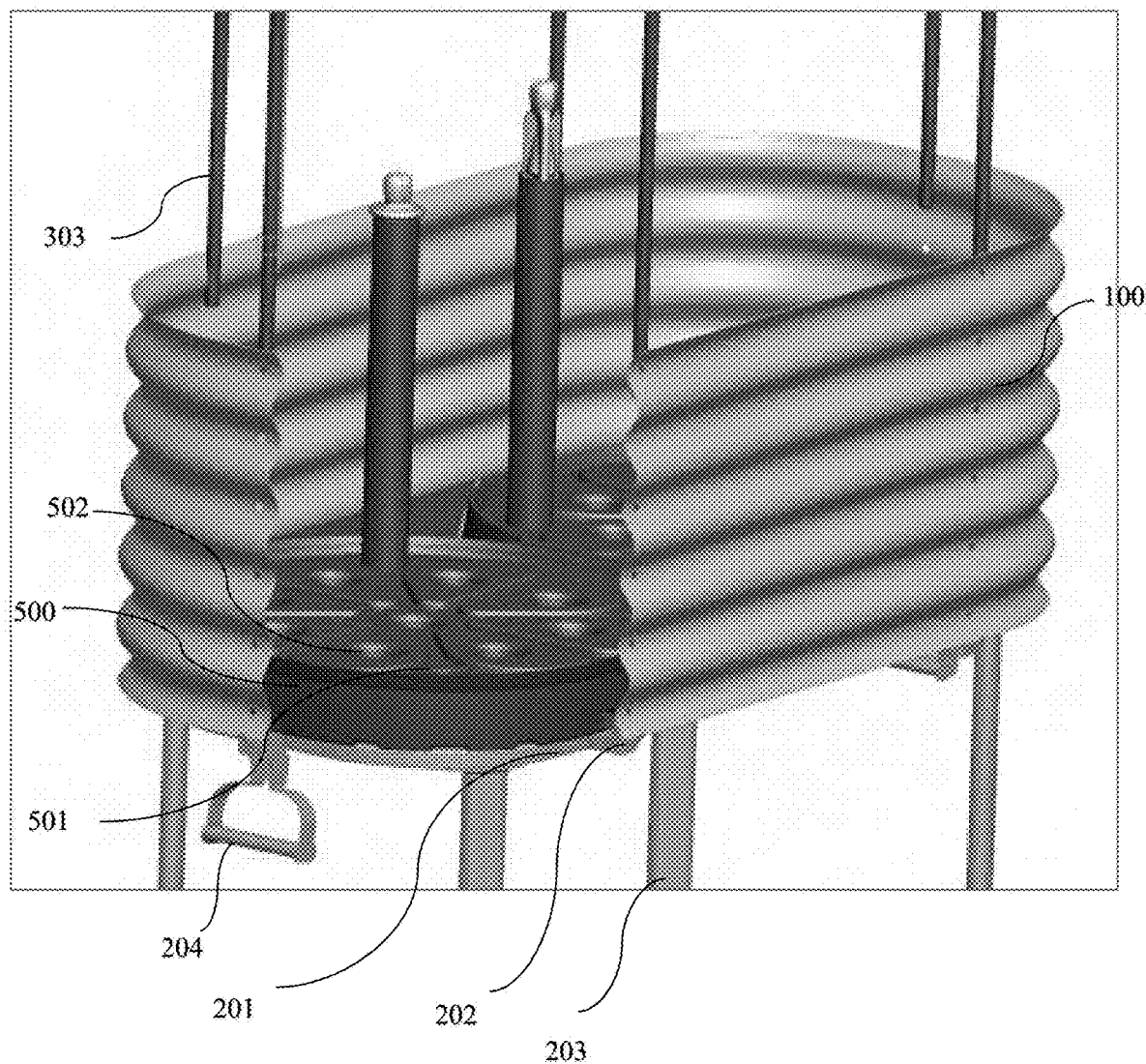
FIG. 6 depicts a top perspective view of the angled joint panel shown in FIG. 1.

As shown in FIG. 3, in one embodiment, one or more garden bed anchors 202 locate on the elevated platform 201 for connecting to and fastening the raised garden bed 100. In one embodiment, the garden bed anchors 202 are disposed on the outer frame of the elevated platform 201 and extend upward. In one embodiment, the garden bed anchors 202 are received by the raised garden bed 100 inside the perimeter of the wall panels, but outside the base perimeters of the wicking cells/self-watering module 500, as shown in FIG. 6.

The elevated rolling stand module 200 also includes one or more moving handles 204. In one embodiment, the moving handles 204 may be attached to the elevated platform 201. In one embodiment, the elevated platform 201 may be attached to 1, 2, 3, 4, or more moving handles 204, such that the elevated rolling stand module 200 can be pulled in any direction.

As shown in FIG. 3, the elevated rolling stand module 200 includes a plurality of supporting legs 203, mechanically supporting the elevated platform 201 from below. In one embodiment, there are 3, 4, 5, 6, 7, 8, or more supporting legs, depending on the shape of the elevated platform 201. In one embodiment, each of the supporting legs 203 is attached to the elevated platform 201 on its upper end, and attached to a rolling wheel 206 on its lower end. In one embodiment, each of the supporting legs 203 has a telescope extending structure such that the length of each supporting leg 203 is adjustable. Therefore, the height of the elevated rolling stand module 200 is adjustable and can be customized according to the user's need.

In one embodiment, the length of each supporting leg 203 is adjustable between 10 inches to 120 inches. In one embodiment, the height of the elevated rolling stand module 200 is about 12 inches. In one embodiment, the height of the elevated rolling stand module 200 is about 24 inches. In one embodiment, the height of the elevated rolling stand module 200 is about 36 inches. In one embodiment, the height of the elevated rolling stand module 200 is about 48 inches. In one embodiment, the height of the elevated rolling stand module 200 is about 60 inches. In one embodiment, the height of the elevated rolling stand module 200 is about 72 inches. In one embodiment, the height of the elevated rolling stand module 200 is about 84 inches. In one embodiment, the height of the elevated rolling stand module 200 is about 96 inches. In one embodiment, the height of the elevated rolling stand module 200 is about 108 inches. In one embodiment, the height of the elevated rolling stand module 200 is about 120 inches.

In one embodiment, the elevated rolling stand module 200 further includes a lower supporting platform 205, which is disposed between and mechanically connected to the supporting legs 203. In one embodiment, the lower supporting platform 205 locates near the lower end of the supporting legs 203. In another embodiment, the height of the lower supporting platform 205 is adjustable between the elevated platform 201 and lower end of the supporting legs 203. The lower supporting platform 205 includes an outer frame and a supporting structure disposed inside the outer frame. The lower supporting platform 205 is configured to be used for supporting gardening items thereon, such that the gardening items can be moved together with the MGS.

Figure 4:
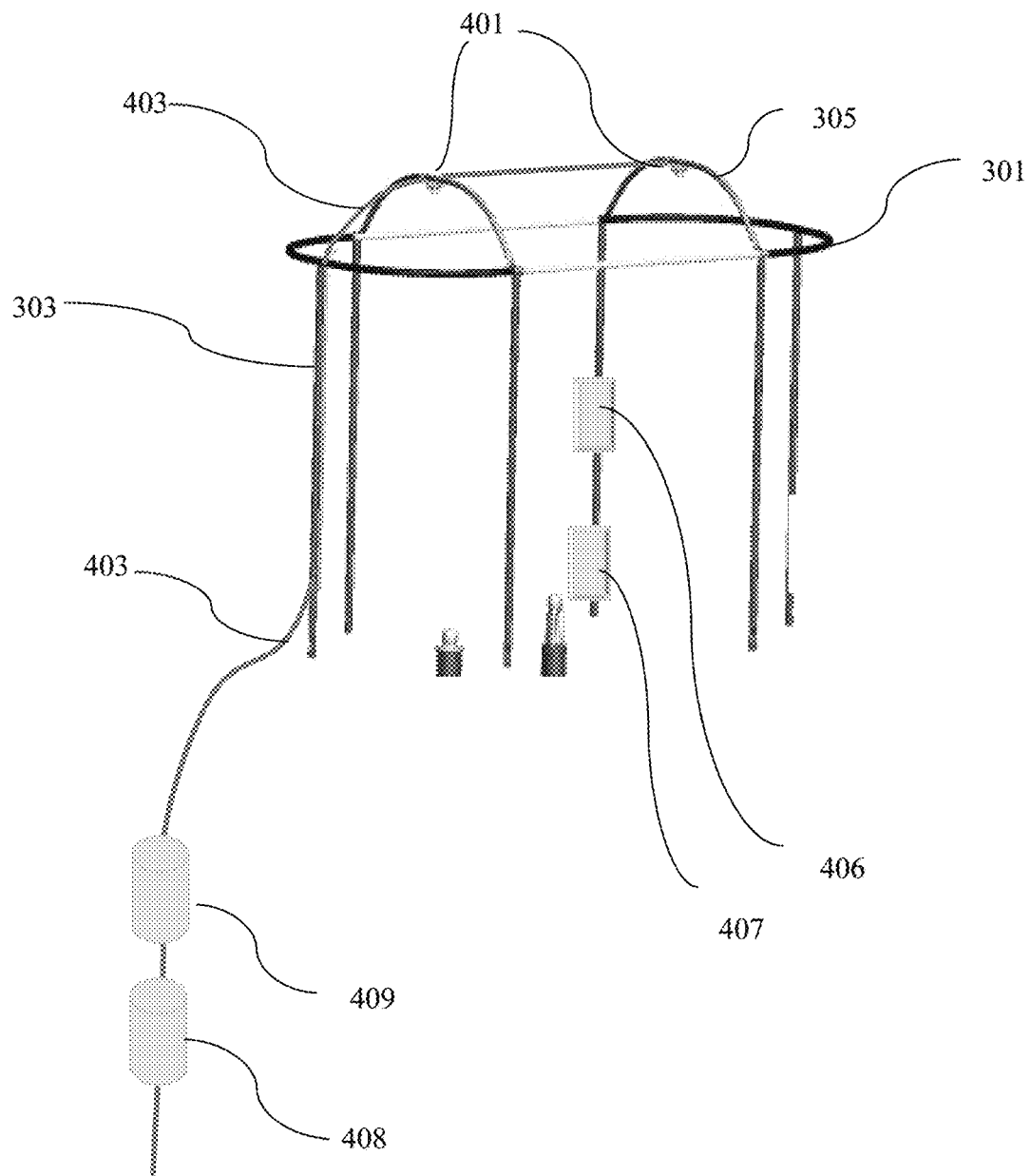
FIG. 4 depicts a perspective view of the bed cover module and mister irrigation module shown in FIG. 1.

FIG. 4 depicts the bed cover module 300 and the mister irrigation module 400. The bed cover module 300 includes a cover frame 301 and a plurality of frame legs 303 mechanically connect to the cover frame 301 on their upper ends. The plurality of frame legs 303 mechanically connect to the raised bed garden 100 on their lower ends. In one embodiment, each of the frame legs 303 has a telescope extending structure such that the length of each frame leg 303 is adjustable. The adjustable frame legs 303 enable the height of the bed cover module 300 to be customized according to the user's need.

In one embodiment, the length of each frame leg 303 is adjustable between 10 inches to 120 inches. In one embodiment, the height of the bed cover module 300 is about 12 inches. In one embodiment, the height of the bed cover module 300 is about 24 inches. In one embodiment, the height of the bed cover module 300 is about 36 inches. In one embodiment, the height of the bed cover module 300 is about 48 inches. In one embodiment, the height of the bed cover module 300 is about 60 inches. In one embodiment, the height of the bed cover module 300 is about 72 inches. In one embodiment, the height of the bed cover module 300 is about 84 inches. In one embodiment, the height of the bed cover module 300 is about 96 inches. In one embodiment, the height of the bed cover module 300 is about 108 inches. In one embodiment, the height of the bed cover module 300 is about 120 inches.

Figure 7:
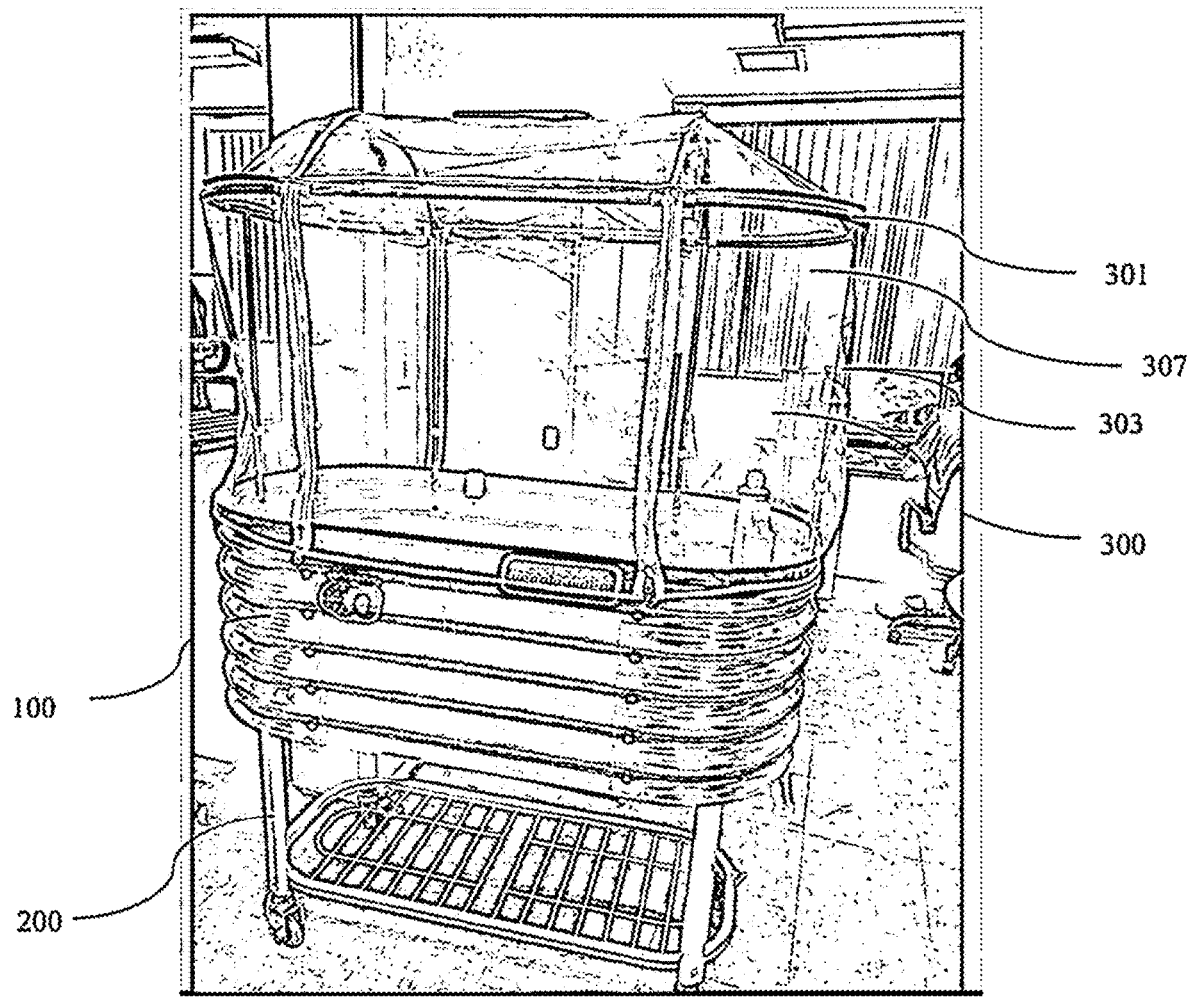
FIG. 7 depicts the perspective view of a modular gardening system (MGS) including raised garden bed module, elevated rolling stand module, bed cover systems module, mister irrigation module, wicking cell/self-watering module shown in FIG. 1.
Figure 8:
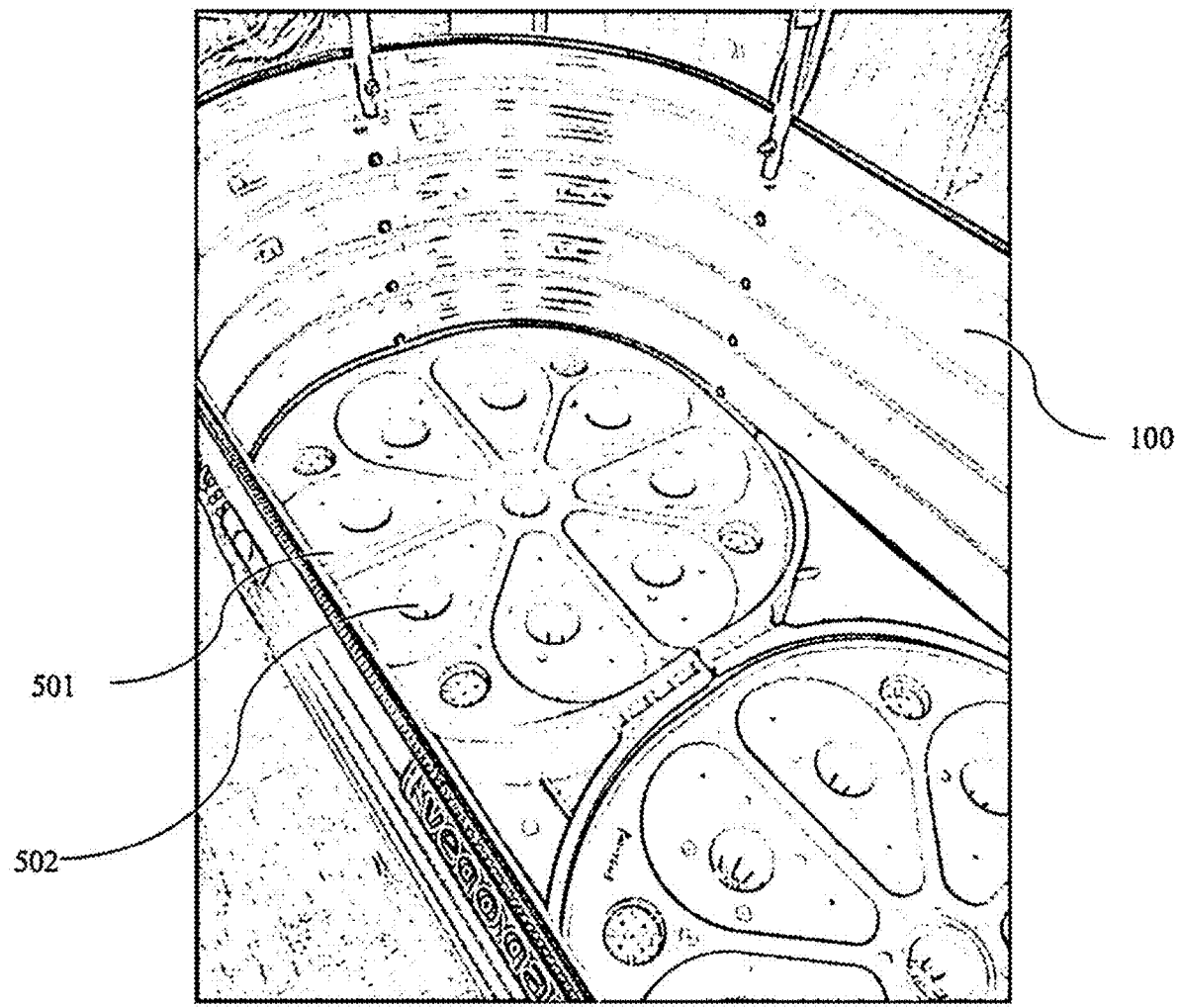
FIG. 8 depicts another perspective view of assembled raised garden bed module, partial elevated rolling stand module, wicking cell self-watering, and partial bed cover system module shown in FIG. 1.

In one embodiment, the bed cover module 300 further includes one or more upper frames 305, on which a mesh 307 may be disposed, as shown in FIG. 7. In one embodiment, the upper frames 305 have an arched shape.

The mesh 307 is disposed outside and surround the cover frame 301, the frame legs 303, and the upper frames 305, such that it forms an enclosed space above the raised garden bed 100, which prevents the pests, critters, and other insects from accessing to the plants in the raised garden bed 100. In one embodiment, the mesh 307 controls the humidity of the enclosed space above the raised garden bed by control the humidity in the air from leaving the enclosed space.

FIG. 4 also depicts the mister irrigation module 400. In particular, the mister irrigation module 400 includes one or more misters 401 which are fluidly connected to a water source/pump and provide water to the raised garden bed 100 via pipes 403. In one embodiment, the pipe 403 are attached to at least one of the cover frame 301, the frame legs 303, and the upper frames 305. In one embodiment, one or more of the cover frame 301, the frame legs 303, and the upper frames 305 have a tube structure that that at least a portion of the pipe 403 is enclosed in the tube structure of the cover frame 301, the frame legs 303, and/or the upper frames 305.

In one embodiment, the misters 401 water the garden bed by spraying the water to the raised garden bed 100. In one embodiment, the misters 401 are mechanically attached to the upper frame 305 of the bed cover system module 300. In another embodiment, the misters 401 are mechanically attached to the cover frame 301 and/or frame legs 303 of the bed cover system module 300. In one embodiment, the misters 401 are also fluidly connected to a nutrition container 409 via the pipes 403, such that the misters 401 may provide a variety of nutrition to the raised garden bed 100 in solution form, including nitrogen, phosphorus, potassium, and minerals needed by the plants during different stages of life cycle. In one embodiment, the nutrition container 409 includes a plurality of housings, with each housing containing one type of nutrition such that the supply of nutrition can be individually controlled and administered to the raised bed garden 100, according to the condition of the soil and plants in the raised garden bed 100.

In one embodiment, the nutrition container 409 may also include a pH housing, containing at least one pH buffer solution for adjusting the pH value of the soil.

Figure 13:
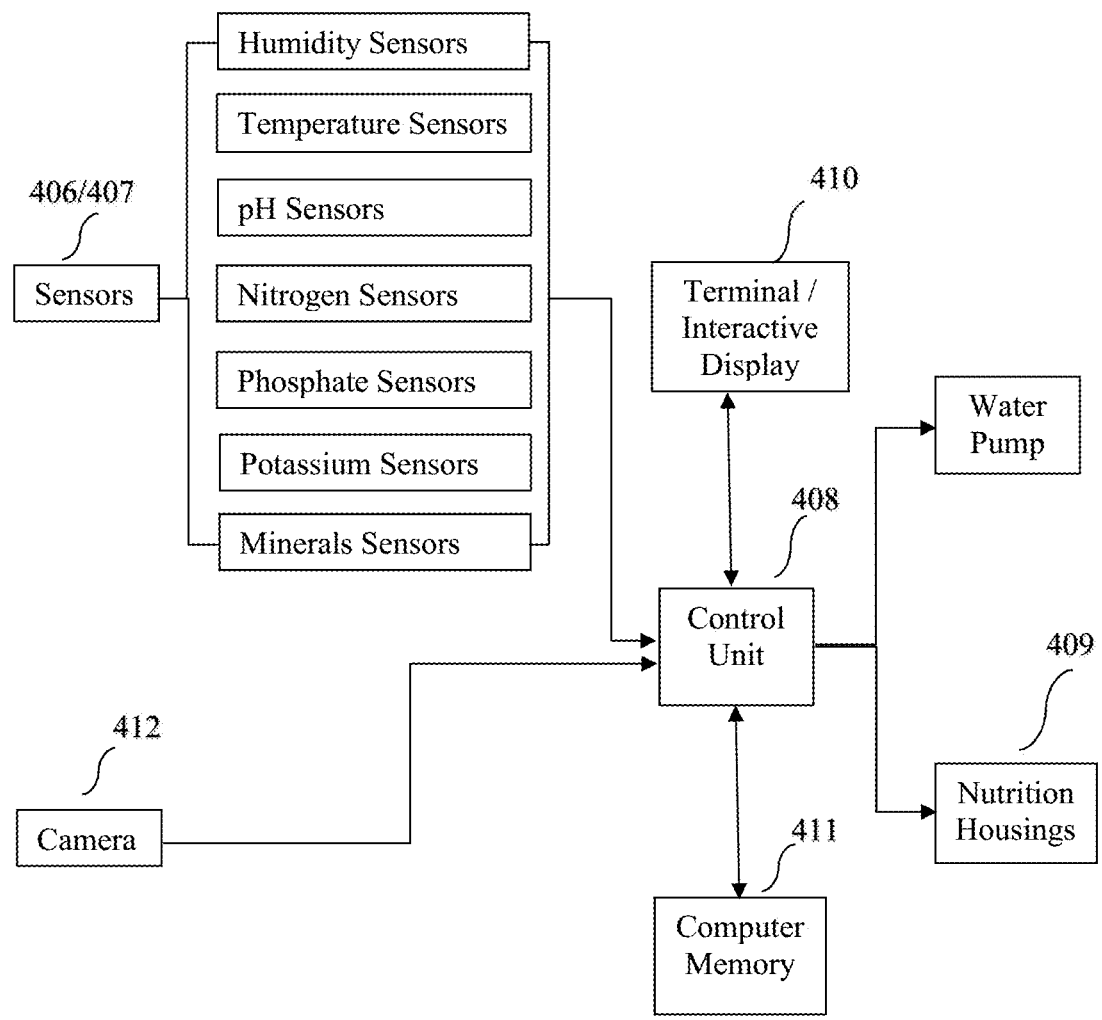
FIG. 13 depicts a systematic view of components of the mister irrigation system shown in FIG. 1.

As shown in FIG. 13, the mister irrigation module 400 may also have one or more sensors 406/407, including temperature sensor, humidity sensor, pH sensor, nitrogen sensor, phosphorus sensor, potassium sensor, and minerals sensor. In one embodiment, one or more sensors 406 are attached to the bed cover system module 300, e.g., humidity sensor, temperature sensor, monitoring the condition of the enclosed space above the raised garden bed 100, e.g., humidity and/or temperature. In one embodiment, some sensors 407, e.g., pH sensor, nitrogen sensor, phosphorus sensor, potassium sensor, and minerals sensor, are in direct or indirect contact with the soil in the raised garden bed 100 to monitor the condition of the soil.

As it is readily appreciated that the minerals monitored by the sensors 406/407 and provided by the nutrition container 409 includes major and trace elements needed by any type of plants, including at least, calcium, magnesium, sulfur, iron, manganese, copper, zinc, boron, molybdenum, and etc.

As shown in FIG. 13, the mister irrigation module 400 further includes a control unit 408 in communication with the sensors 406/407, misters 401, and nutrition container 409 via wire or wireless connection. The control unit 408 may be a microcontroller unit (MCU) including one or more processors and being configured to receive signals from the sensors 406/407 regarding the temperature, humidity, pH value, nitrogen concentration, phosphorus concentration, potassium concentration, and/or minerals concentrations, and determines if these values/concentrations need to be adjusted in term of plants' health and growth. If the control unit 408 determines that one or more of these values/concentrations should be adjusted, the control unit 408 would communicate with the nutrition container 409 and misters 401 such that the misters 401 would provide necessary water, pH buffer solution, and/or nutrition solutions to the raised garden bed 100.

In one embodiment, the control unit 408 is in electronic communication with an interactive display coupled to the control unit 408 for receiving inputs, e.g., preferred temperature, humidity, pH, nutrition concentrations, watering time settings, and etc. from the user, and/or presents information to the user, e.g., current temperature, humidity, pH, nutrition concentrations, watering time settings, and etc. for monitoring the plant growing conductions in real time. The interactive display may include an APP with a graphical user interface (GUI). The interactive display may include a display and/or a mobile device such as a smart phone, a smart watch, a tablet, etc. The term "APP", used herein the specification, refers to an application, especially as downloaded by a user to and installed in a mobile device, which a software program that is designed to perform specific functions directly for the user or, in some cases, for another application program or for operations of devices such as the sensors 406/407, the misters 401, the nutrition container 409, the camera 412, and so on.

In one embodiment, the control unit 408 is in wireless communication with a terminal 410 such as a computer or a smart phone, such that the mister irrigation module 400 has a smart control function which automatically determines and controls the temperature, humidity, pH, nutrition concentrations, watering time settings for the plants in the raised garden bed, based on the user's input, e.g., the plant species or type, or desired temperature, humidity, pH, nutrition concentrations, watering time settings. In some embodiments, the terminal 410 may include the interactive display.

In one embodiment, the mister irrigation module 400 further includes a camera 412 which obtains picture/video information of the plants and/or soil in the raised bed garden 100. In one embodiment, the picture/video information is transmitted by the control unit 408 to the computer server or the cell phone such that the user can obtain real-time picture/video of the plants/soil in the raised bed garden remotely.

In one embodiment, the mister irrigation module 400 further includes a readable and/or writeable memory 411 to store the information obtained by the sensors 406/407 and/or camera. In one embodiment, the readable and/or writeable memory 411 stores the inputs it received from the user via terminals or interactive display.

Figure 5:
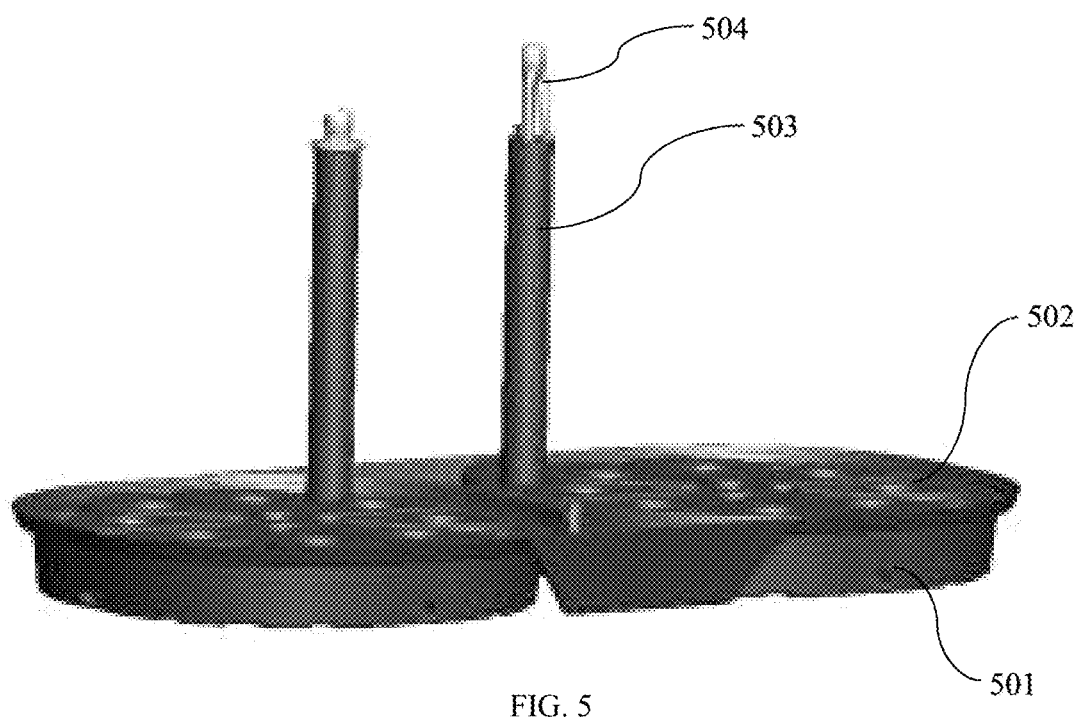
FIG. 5 depicts another perspective view of assembled raised garden bed module, partial elevated rolling stand module, wicking cell self-watering, and partial bed cover system module shown in FIG. 1.

FIG. 5 shows the wicking cell/self-watering module 500. The wicking cell/self-watering module 500 includes a wicking tray 501 having a plurality of recessed cells 502. In one embodiment, the wicking tray 501 is disposed at the bottom of the raised garden bed 100, and on top of the elevated platform 201, as shown in FIG. 6. The upper surface of the wicking tray 501 supports the content of the raised garden bed 100 including soil and plants, while the recessed cells 502 collect excess water when the soil moisture level is high. The collected water would feed the dry soil through wicking when the soil moisture level is low. In one embodiment, each of the recessed cells 502 has one or more openings on its bottom surface, through which the water may enter into a common water reservoir at the bottom of the wicking tray 501. In one embodiment, the wicking cell/self-watering module 500 has one or more pillars 503 in fluid communication with the reservoir of the wicking tray 501. Each of the pillars 503 is fluidly connected to the wicking tray 501 on its lower end, and connected to a cap structure 504 on its upper end. In one embodiment, water may be manually filled into or extracted from the reservoir of the wicking tray 501 via the pillar 503.

Figure 9:
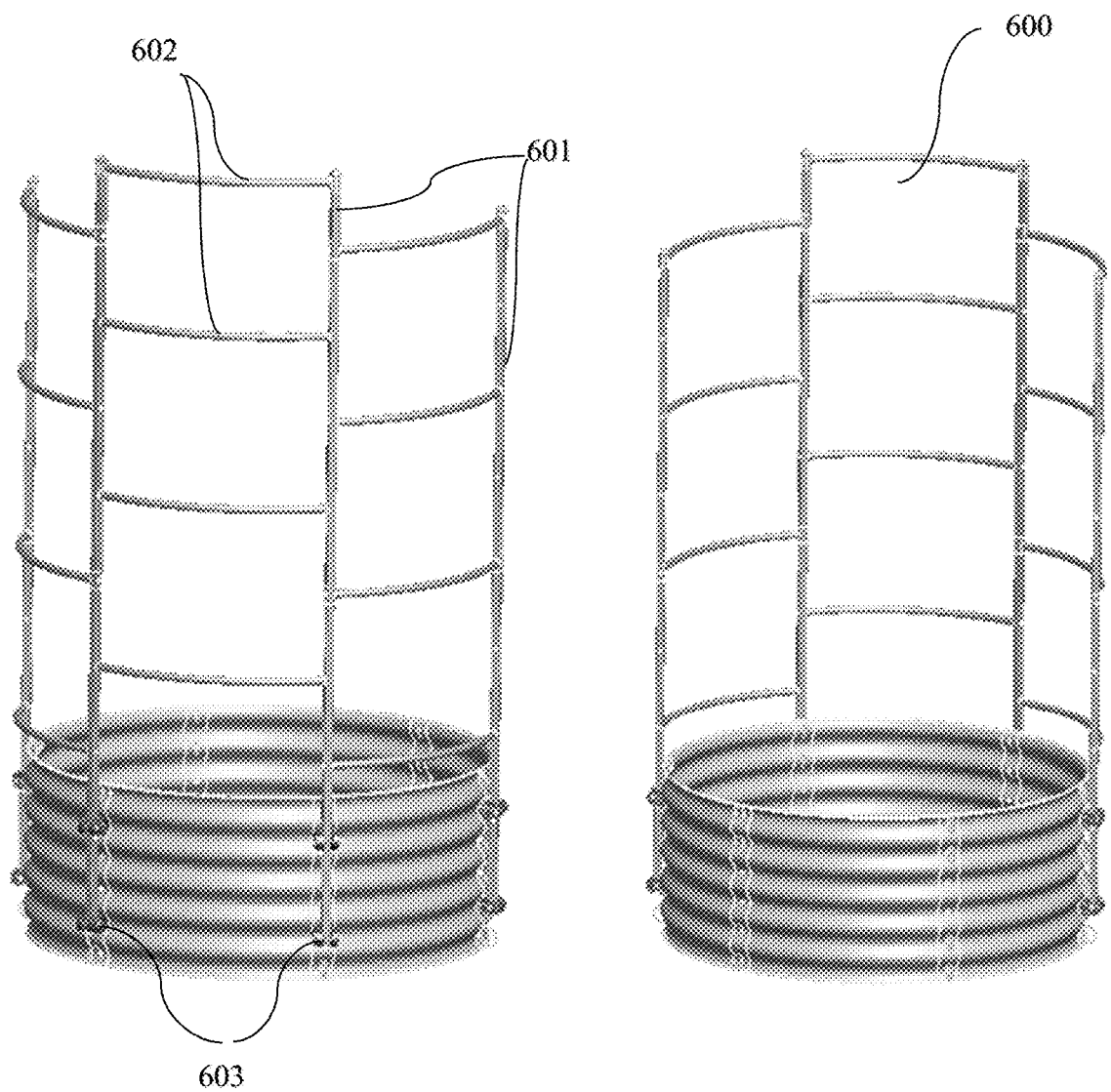
FIG. 9 depicts a perspective view of wall trellis module for the garden bed.

FIG. 9 illustrates a wall trellis module 600 for the garden bed 100. The wall trellis module 600 is connected to the garden bed for climbing plants, e.g., vines, to climb. As it is readily appreciated, the garden bed used in association with the trellis may be a raised garden bed or a non-raised garden bed. That is, the garden bed 100 may or may not be disposed on the elevated rolling stand module 200 when the trellis module 600 is connected to the garden bed 100.

The wall trellis module 600 includes a plurality of vertical pillars 601 and horizontal frames 602 interconnected with each other. In one embodiment, each vertical pillar 601 is connected to the wall panel(s) of the garden bed 100 via one or more trellis connectors 603. In one embodiment, the vertical pillars 601 are aligned substantially parallel with each other and are all substantially perpendicular to the garden bed 100. In one embodiment, one or more horizontal frames 602 are connected to a pair of vertical pillars 601 as shown in FIG. 9. It is readily appreciated that the number and the length of the vertical pillars 601 and number of the horizontal frames 602 can be customized according to the user's need. In one embodiment, the distance between a pair of the vertical pillars 601 and the length of the horizontal frames 602 are customizable to meet the user's need.

Figure 10:
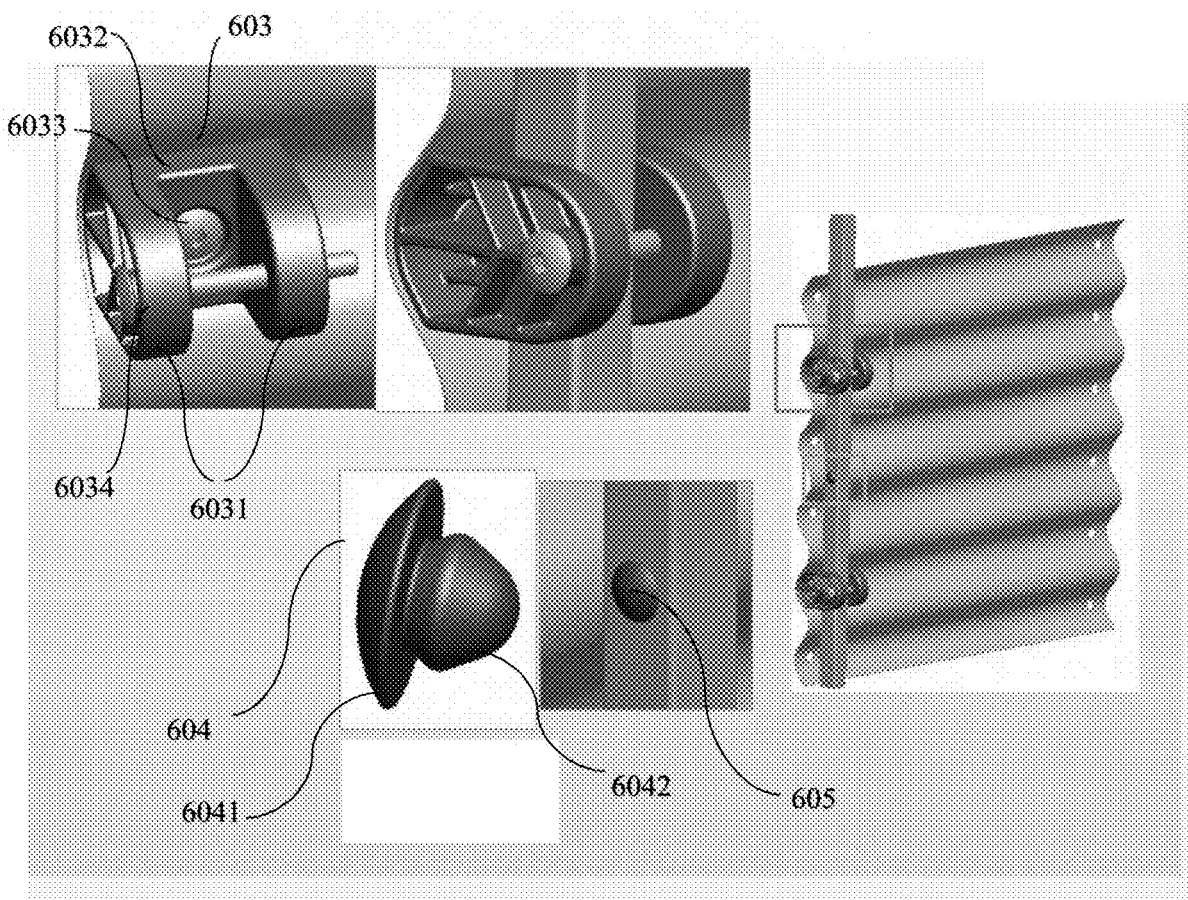
FIG. 10 depicts a perspective view of a connection system connects the wall trellis to the garden bed.

As shown in FIG. 10, the vertical pillars 601 are connected to the wall panels of the garden bed 100 via the trellis connectors 603. Each trellis connector 603 has a side base 6032 connected to the wall panel and a pair of connector brackets 6031 extending outward from two ends of the side base 6032 to form a U-shaped connector. The side base has a side base hole 6033 receiving a fastener, e.g., a screw, blot, and cork, which connects the trellis connector 603 to the wall panel of the garden bed 100.

In one embodiment, the side base 6032's surface in contact with the wall panel has a shape seamlessly contacting the shape of the wall panel. For example, when the wall panel comprises a plurality of curved sections and thus has a sinusoidal configuration, the side base 6032's surface in contact with the wall panels also has a curved shape having substantially same amplitude and period such that the side base 6032 and the wall panel seamlessly connect to each other.

In one embodiment, each of the connector brackets 6031 is integrated to the side base 6032 on one of its end, and extends outward on the other end. In one embodiment, each of the connector brackets 6031 has a pillar fastening hole 6034 for receiving a fastener. The fastener is received in both pillar fastening holes 6034 of a pair of connector brackets 6031, such that a vertical pillar 601 is received and fastened in a space peripherally enclosed by the fastener, the side base 6032, and the pair of the connector brackets 6031.

In one embodiment, each vertical pillar 601 has a plurality of pillar holes 605. In one embodiment, the pillar hole 605 may receive the fastener which passes through the pillar fastening holes 6034 of a pair of connector brackets 6031, such that the vertical pillar 601 is connected and fastened to the wall panel of the raised garden bed 100 via the trellis connector 603.

In one embodiment, a pillar hole 605 may receive a hole plug 604 when it is not used for receiving a fastener. The hole plug 604 has a tapered hole cork 6042 configured to be received in the pillar hole 605, and a plug butt 6041 having a diameter larger than the diameter of the tapered hole cork 6042.

Figure 11:
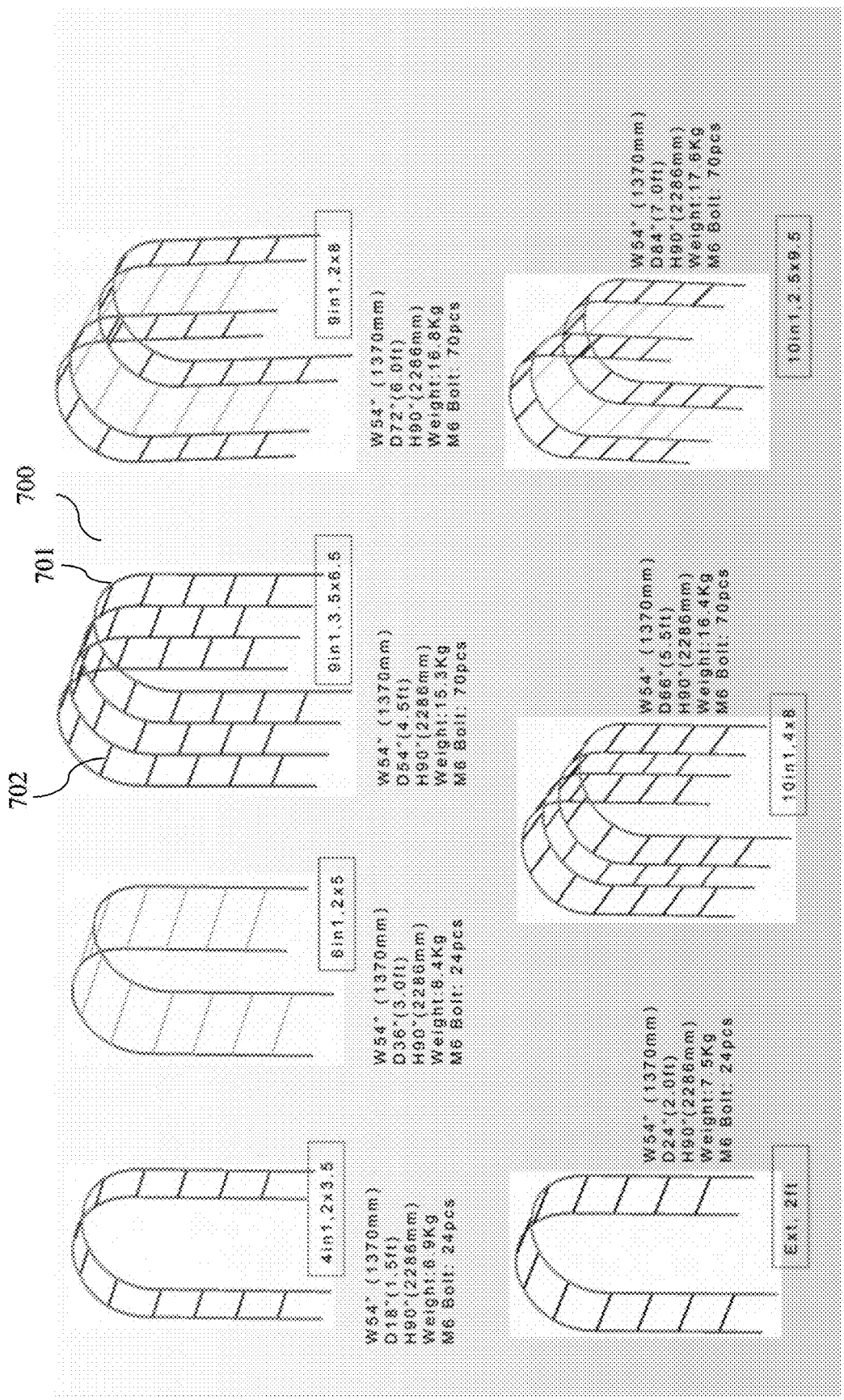
FIG. 11 depicts a perspective view of arched trellis module for the garden bed.

FIG. 11 depicts the arched trellis module 700. In one embodiment, the arched trellis module 700 can be connected to the garden bed 100 with the trellis connectors 603. The arched trellis module 700 includes a plurality of arched pillars 701 each having two substantially paralleled legs supporting an arch, and one or more of horizontal frames 702. In one embodiment, the arched pillars 701 are aligned in parallel with each other and are connected to the garden bed 100 with the trellis connectors 603 in ways described above. In one embodiment, the distance between the paralleled arched pillars 701 can be customized according to the user's need. In one embodiment, the width and depth of the arched trellis module 700 is adjustable to accommodate the dimension of the garden bed 100. It is readily appreciated that the number of the arched pillars 701 and the distance between the arched pillars 701 can also be customized to accommodate the dimension of the garden bed 100.

The horizontal frames 702 are connected to a pair of the arched pillars 701, the length of each horizontal frame 702 can be customized to accommodate the distance between the paralleled arched pillars 701.

Figure 12:
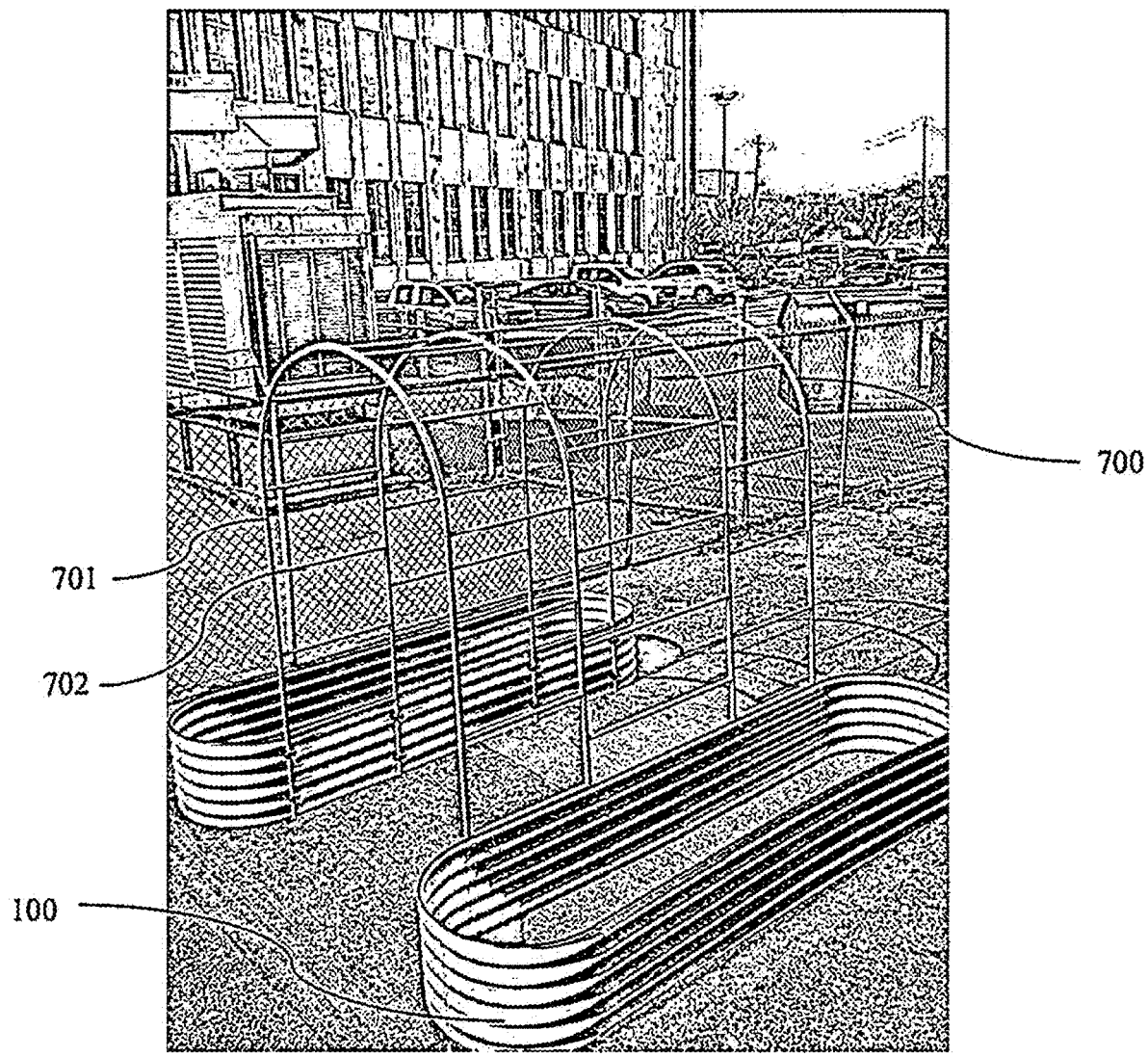
FIG. 12 depicts a perspective view of arched trellis module connecting more than one garden beds.

As shown in FIG. 12, in one embodiment, the arched trellis module 700 is installed between two garden beds 100 to create a trellis for climbing plants and a walkway. In particular, one leg of an arched pillar 701 is connected to the wall panel of one garden bed 100, and the other leg of the arched pillar 701 is connected to the wall panel of another garden bed 100.

Figure 14:
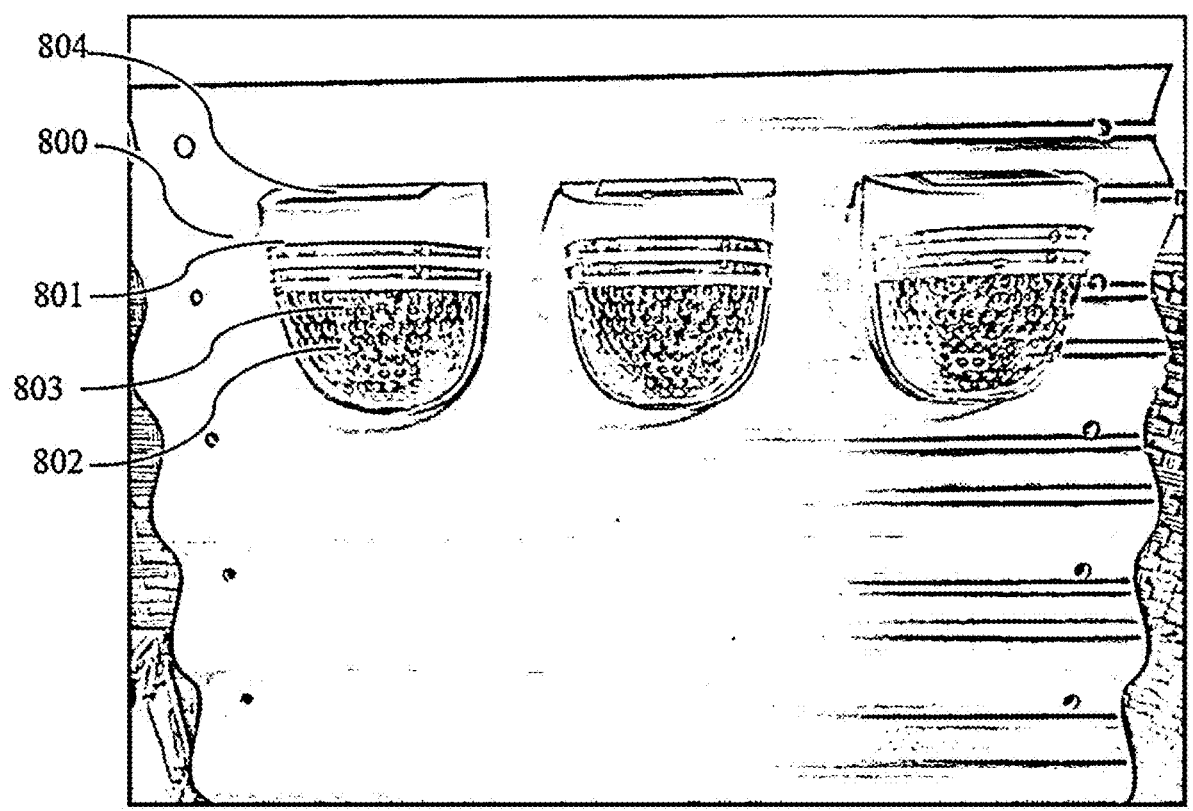
FIG. 14 depicts a front perspective view of three individual solar lights.

FIGS. 14-17 depict embodiments of a solar light 800 attached to the garden bed 100. The solar light 800 includes a light frame 801, a light cover 802 attached or integrated with the light frame. In one embodiment, the light cover 802 is transparent. In one embodiment, the light cover includes rugged surface configuration as shown in FIG. 14. In one embodiment, the light cover is removable from the frame, such that a light bulb 803 locates inside the light cover 802 can be replaced.

The solar light 800 also includes a solar panel 804 on the top surface of the light frame 801 for receiving solar light and converting the light energy into electrical energy. In one embodiment, the solar panel 804 is detachable from the light frame 801. In one embodiment, angle between the solar panel and the top surface of the light frame 801 is adjustable such that the user may adjust the direction of the solar panel 804 to maximize the solar light energy could be received by the solar panel 804.

In one embodiment, the solar panel 804 also includes a light sensor to sense the solar light power and control the turning on and off of the light bulb 803 according to the solar lighting condition of the environment. That is, the light bulb 803 would be turned on in a dark environment, as the light sensor of the the solar panel 804 senses that the environment is dark; while the light bulb 803 would be turned off in an bright environment, as the light sensor of the solar panel 804 senses that the environment is bright.

In one embodiment, the solar light further comprise a switch 807 directly controlling the turning on and off of the light bulb 803. In another embodiment, the switch 807 directly controls the turning on and off of the light sensor of the solar panel 804, and therefore indirectly control the light bulb 803.

Figure 15:
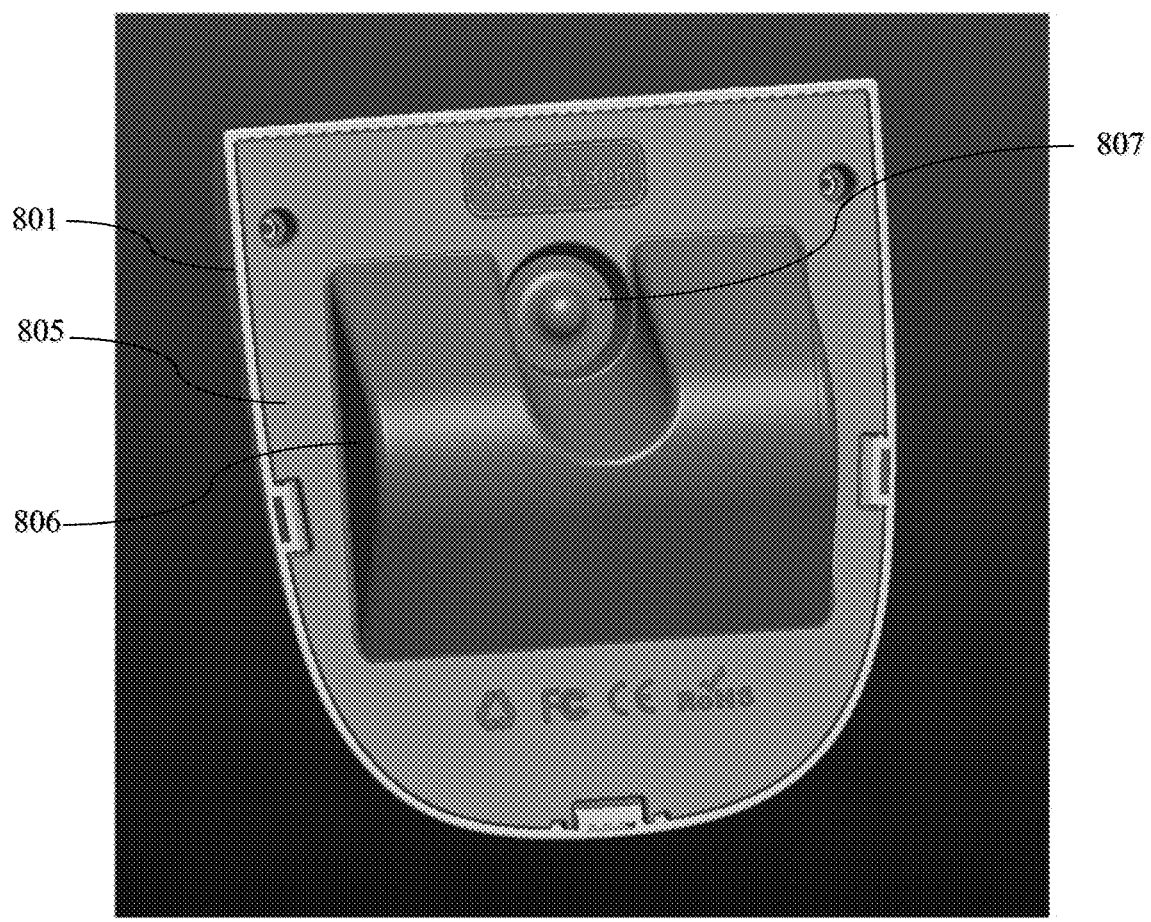
FIG. 15 depicts a back perspective view of the solar light.

FIG. 15 shows one embodiment of the back side of the solar light 800. A back panel 805 is attached to the light frame 801. In one embodiment, the back panel 805 is removable from the light frame 801. In one embodiment, the solar light 800 includes a light connector 806, connecting the light to the wall panel of the garden bed 100. In one embodiment, the light connector 806 includes a magnet which connects the solar light 800 to the wall panel via magnetic force. In another embodiment, the light connector 806 attaches the solar light 800 to the wall panel via fasteners e.g., screw, bolt, tape, or glue. In one embodiment, the solar light 800 is detachable from the garden bed 100 without using of any tools.

Figure 16:
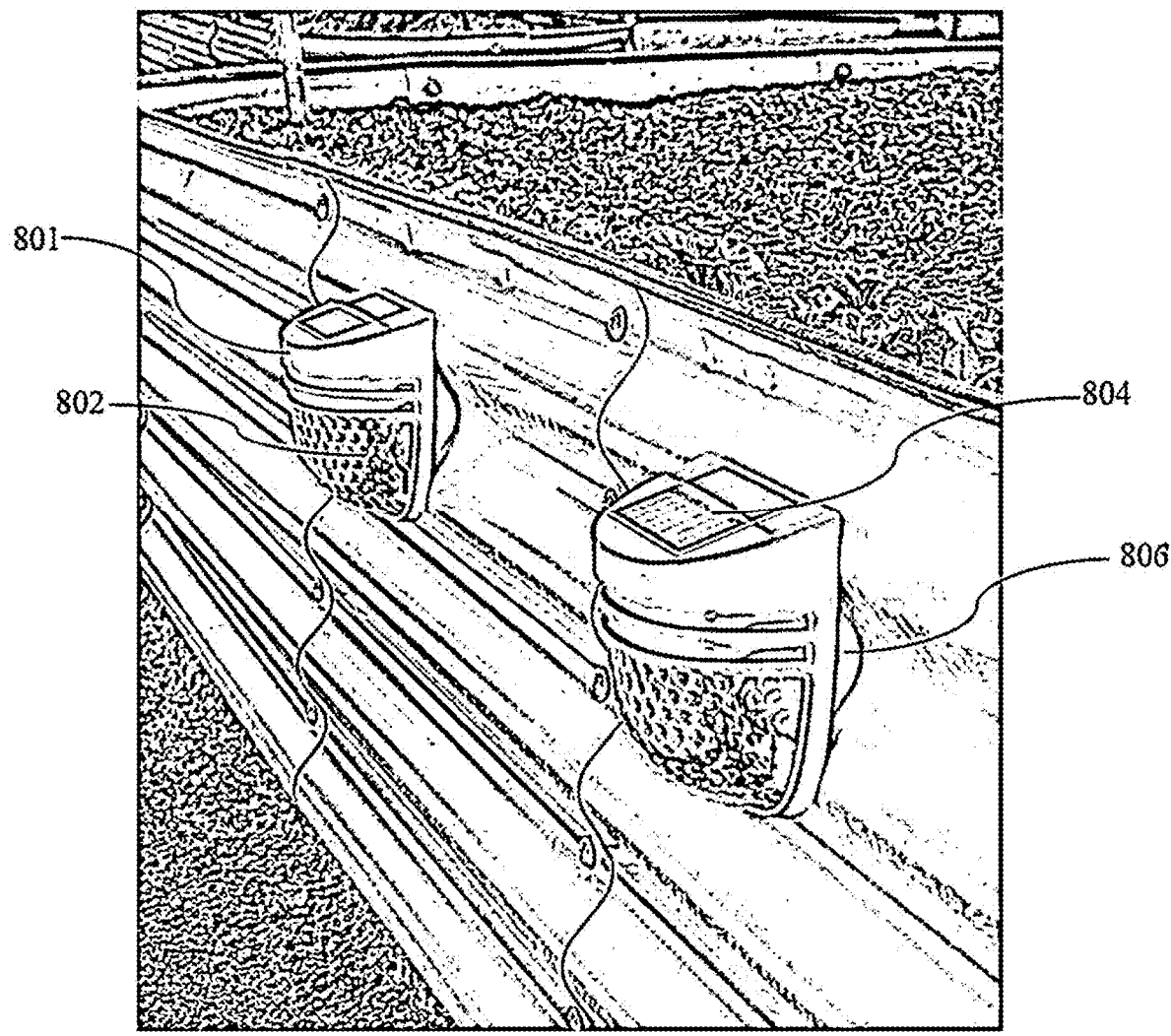
FIG. 16 depicts a side perspective view of the solar light.
Figure 17:
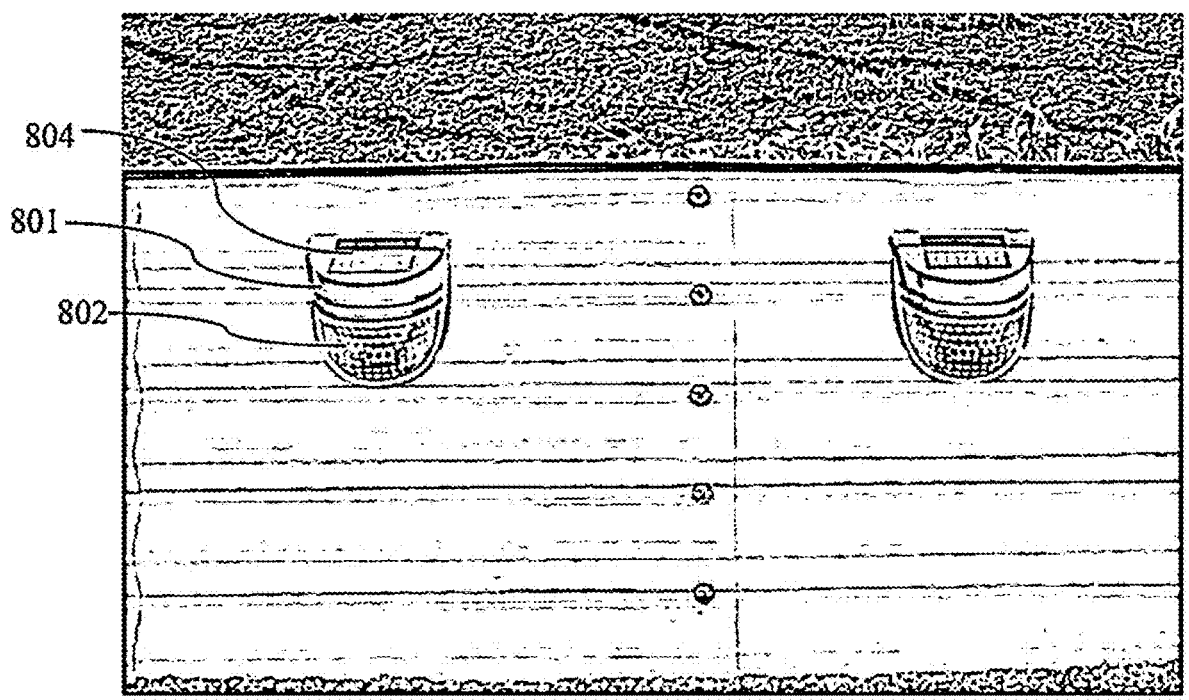
FIG. 17 depicts a front perspective view of two individual solar lights.

In one embodiment, the light connector has a surface in seamless contact with the wall panel, as shown in FIG. 16. That is, if the wall panel of the garden bed 100 has sinusoidal configuration comprising a plurality of curved sections, the light connector 806 has a surface including at least one curved section which is similar to the curved sections of the wall panel such that the surface of the light connector 806 seamlessly contact the curved section of the wall panel, as shown in FIG. 16

FIGS. 18-21 show embodiments of a tool box 900 attached to the garden bed 100. The tool box 900 includes a box body 901 for containing tools, a box lid 902 disposed over the top of the box body 901, and a box latch 903 securing the box body 901 and box lid 902 together. The box lid 902 is pivotally attached to the box body 901 on one lateral side and is secured to the box body 901 on the opposite lateral side via the box latch 903. The box lid 902 can be pivotally turned such that the tool box 900 can be opened. In one embodiment, the box latch 903 includes an opening locates on the cover lid 902, and a securing tongue locates on the box body 901 and being received by the opening on the cover lid 902.

The box body 901 has a dimension proper for containing common gardening tools such as scissors, cutters, hand shovels, and etc. In one embodiment, the tool box 900 has a width and a height range from 5 inch to 50 inch. In one embodiment, the tool box has a depth ranges from 3 inch to 20 inch.

Figure 18:
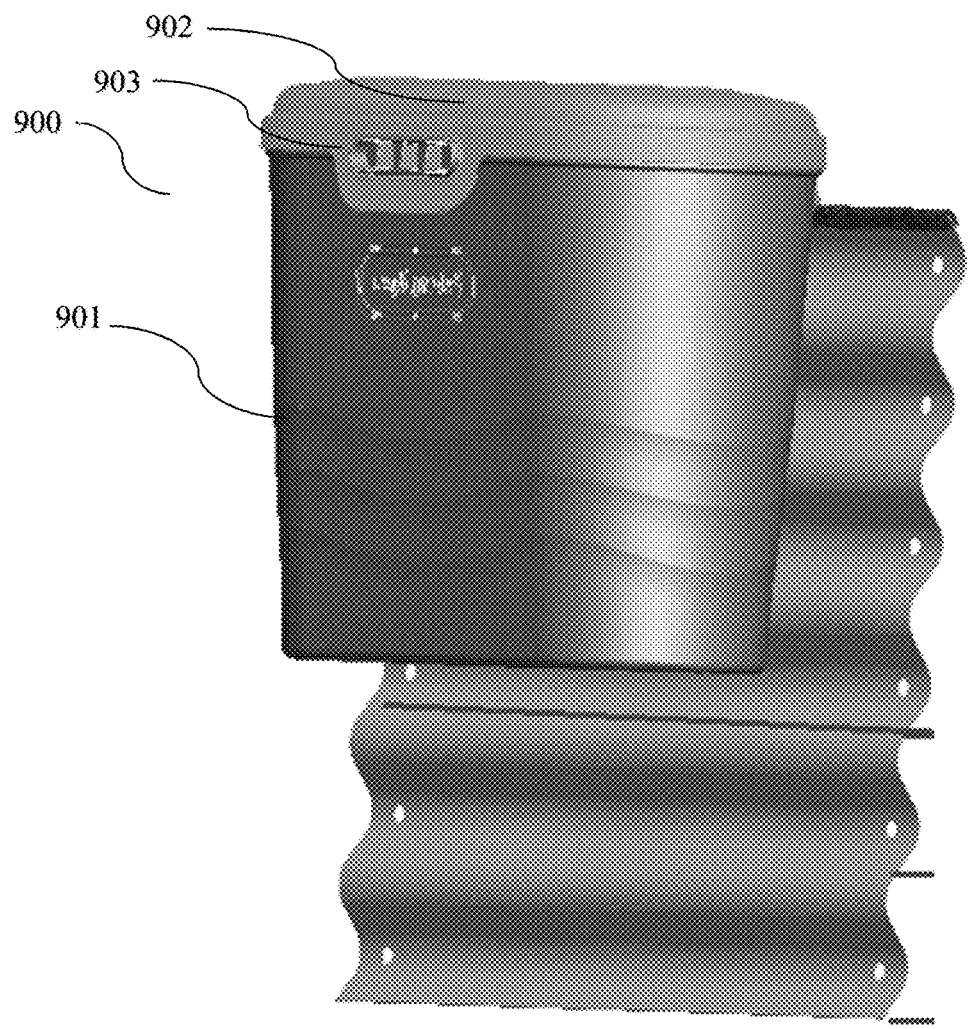
FIG. 18 depicts a side perspective view of a tool box.
Figure 19:
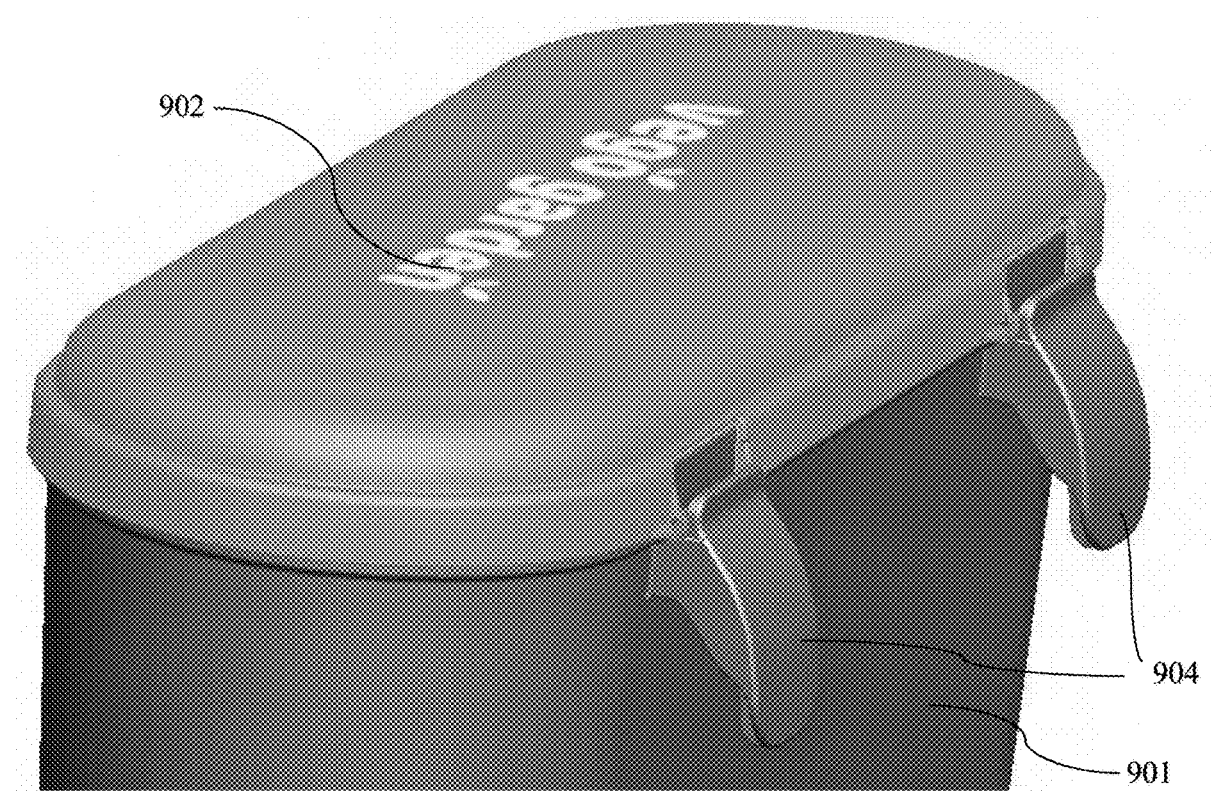
FIG. 19 depicts a top perspective view of the tool box.
Figure 20:
FIG. 20 depicts another side perspective view of the tool box.
Figure 21:
FIG. 21 depicts a bottom perspective view of the tool box.

As shown in FIG. 19, the tool box 900 is detachable from the garden bed 100. In one embodiment, the tool box 900 has at least one box hook 904, which attaches the tool box 900 to the wall panel of the garden bed 100. In one embodiment, the box hook 904 is attached or integrated to the box body 901. In one embodiment, the box hook is also attached to the box lid 902 while permitting the pivot movement of the box lid 902 as described above. As shown in FIG. 18, in one embodiment, the box hook 904 hangs the tool box 904 over the top edge of the wall panel of the garden bed 100.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A modular gardening system (MGS) for plant growing, the system comprising:
   a garden bed comprising at least one wall panel forming a peripherally enclosed area for containing soil that is configured to grow at least one plant therein;
   a trellis module connected to the garden bed, wherein the trellis module comprises at least two vertical pillars, each vertical pillar being connected to the at least one wall panel via one or more trellis connectors; wherein each trellis connector comprises a side base and a pair of connector brackets extending outward from two ends of the side base to form a U-shaped connector; wherein the side base has at least one base hole receiving a base fastener to connect said trellis connector to the at least one wall panel, and an outer surface of the side base in contact with the at least one wall panel has a shape seamlessly contacting a shape of the at least one wall panel; and wherein each connector bracket has a pillar fastening hole receiving a pillar fastener to fasten one of the at least two vertical pillars, such that, as assembled, the pillar fastener is received in both pillar fastening holes of the pair of connector brackets, and said vertical pillar is received and fastened in a space enclosed by the pillar fastener, and the side base and the pair of the connector brackets of said trellis connector, thereby connecting said vertical pillar to the at least one wall panel;
   an elevated rolling stand module supporting the garden bed;
   a bed cover system module disposed on top of the garden bed; and
   a mister irrigation module providing irrigation to the plant.

2. The MGS according to claim 1, wherein
   the elevated rolling stand module comprises an elevated platform supporting the garden bed, and a plurality of supporting legs mechanically connected to the elevated platform on the upper end of each supporting leg and support the elevated platform.

3. The MGS according to claim 2, wherein
   the length of each of the supporting legs is adjustable such that the height of the elevated platform is adjustable.

4. The MGS according to claim 2, wherein
   the elevated rolling stand module further comprises at least one handle attached to the elevated platform; and each supporting leg is connected to a wheel on its lower end.

5. The MGS according to claim 2, wherein
   the elevated rolling stand module further comprises a lower platform locates below the elevated platform.

6. The MGS according to claim 1, wherein
   the bed cover system module comprises a cover frame supported by a plurality of frame legs, wherein the frame legs are mechanically connected to the garden bed.

7. The MGS according to claim 6, wherein
   the length of each of the frame legs are adjustable such that the height of the cover frame is adjustable.

8. The MGS according to claim 6, wherein
   the bed cover system module further comprises a mesh, wherein the mesh is disposed over the cover frame and the frame legs.

9. The MGS according to claim 8, wherein
   the mesh balances humidity of a space between the garden bed and the mesh.

10. The MGS according to claim 1, wherein
    the mister irrigation module comprises at least one mister, at least one pipe in fluid communication with the at least one mister and a water source;
    wherein the at least one mister provides water irrigation to the plant in the garden bed.

11. The MGS of claim 1, wherein the mister irrigation module comprises:
    at least one sensor for monitoring at least one growth condition of the soil, wherein the at least one growth condition comprises pH of the soil, nitrogen concentration of the soil, phosphorus concentration of the soil, potassium concentration of the soil, and/or mineral concentrations of the soil; and wherein the at least one sensor comprises one or more of a pH sensor for monitoring the pH value of the soil, a nitrogen sensor for monitoring the nitrogen concentration of the soil, a phosphorus sensor for monitoring the phosphorus concentration of the soil, a potassium sensor for monitoring the potassium concentration of the soil, and a mineral sensor for monitoring the mineral concentration of the soil;

a nutrition container containing at least one nutrition solution comprising a pH buffer solution, a nitrogen solution, a phosphorus solution, a potassium solution, and/or a mineral solution; and a control unit in communication with the at least one sensor and the nutrition container, configured to receive the at least one growth condition monitored by the at least one sensor; and to irrigate the at least one nutrition solution to the plant based on the at least one growth condition monitored by the at least one sensor.

12. The MGS according to claim 11, wherein
the growth condition further comprises humidity of the soil and space above the soil, and temperature of the soil and the space above the soil; and
the at least one sensor further comprises one or more of a humidity sensor for monitoring the humidity of the soil, and a temperature sensor for monitoring the temperature of the soil.

13. The MGS according to claim 11, wherein
the control unit is in wire or wireless communication with a terminal, wherein the terminal remotely controls the water irrigation and nutrition solution irrigation via the control unit.

14. The MGS according to claim 13, wherein
the terminal receives at least one preferred growth condition from a user, wherein the terminal compares the growth condition received from the control unit and the preferred growth condition from the user, and the terminal controls the water irrigation and nutrition solution irrigation via the control unit based on the comparison.

15. The MGS according to claim 1, wherein
the MGS further comprises a camera in wireless communication with a terminal, wherein the camera obtains picture information of the plant in the garden bed and transmits the picture information to the terminal.

16. The MGS according to claim 1, wherein
the MGS further comprises a wicking cell/self watering module, wherein the wicking cell/self watering module comprises a wicking tray having a water reservoir and at least one recessed cell in fluid communication with the water reservoir.

17. The MGS according to claim 16, wherein
the water reservoir collects the excess water from the soil via the at least one recessed cell when the humidity of the soil is high.

18. The MGS according to claim 16, wherein
the wicking tray further comprises a vertical tube in fluid communication with the water reservoir.

19. The MGS according to claim 16, wherein
the wicking tray is disposed on the bottom of the garden bed.

20. The MGS according to claim 1, wherein
the trellis module further comprises at least one horizontal frame.

21. The MGS according to claim 20, wherein
the distance between the two vertical pillars and the length of the at least one horizontal frame are configured to be customizable based on the dimension of the garden bed.

22. The MGS according to claim 1, wherein
the trellis module further comprises at least one arched pillar, wherein each of the arched pillars is connected between the two vertical pillars.

23. The MGS according to claim 1, further
a tool box configured to contain at least one gardening tool,
wherein the tool box is removeably attached to the garden bed.

24. The MGS according to claim 23, wherein
the tool box comprises at least one hook which is configured to receive a portion of a top edge of the wall panel of the garden bed.

25. The MGS according to claim 1, further comprising a gardening solar light comprising:
a light frame;
a solar panel attached to a top surface of the light frame;
a light in electrical communication with the solar panel; and
a light connector connecting the gardening solar light to the wall panel of the garden bed,
wherein one surface of the light connector is in seamless contact with the wall panel.

26. The MGS according to claim 25, wherein
the surface of the light connector in seamless contact with the wall panel of the garden bed comprise a curved section.

27. The MGS according to claim 25, wherein
the light connector comprise a magnet such that the gardening solar light is connected to the wall panel via magnetic force.

28. The MGS according to claim 1, wherein
each vertical pillar has at least one pillar hole, wherein, as assembled, the pillar fastener is received sequentially in the pillar fastening hole of one of the pair of connector brackets, the at lest one pillar hole of said vertical pillar and the pillar fastening hole of another one of the pair of connector brackets to connect said vertical pillar to the at least one wall panel.

29. The MGS according to claim 1, wherein
the at least one wall panel comprises a plurality of curved sections in a sinusoidal configuration, and wherein the outer surface of the side base of each trellis connector in contact with the at least one wall panels has a curved shape being substantially complementary to the sinusoidal configuration of the at least one wall panel such that the side base and the at least one wall panel seamlessly connect to each other.

* * * * *